(12) United States Patent
Koorapaty et al.

(10) Patent No.: US 9,301,291 B2
(45) Date of Patent: Mar. 29, 2016

(54) METHODS OF PROCESSING ENHANCED PHYSICAL DOWNLINK CONTROL CHANNEL INFORMATION INCLUDING DIFFERENTIATING BETWEEN SETS OF PHYSICAL RESOURCE BLOCK PAIRS, AND RELATED NETWORK NODES AND USER EQUIPMENTS

(71) Applicant: Telefonaktiebolaget L M Ericsson (publ), Stockholm (SE)

(72) Inventors: Havish Koorapaty, Saratoga, CA (US); Jung-Fu Cheng, Fremont, CA (US); Erik Eriksson, Linkoping (SE); Mattias Frenne, Uppsala (SE); Johan Furuskog, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 265 days.

(21) Appl. No.: 13/832,948

(22) Filed: Mar. 15, 2013

(65) Prior Publication Data

US 2014/0092822 A1    Apr. 3, 2014

Related U.S. Application Data

(60) Provisional application No. 61/707,285, filed on Sep. 28, 2012.

(51) Int. Cl.
*H04W 72/04*   (2009.01)
*H04L 5/00*    (2006.01)

(52) U.S. Cl.
CPC ........... *H04W 72/042* (2013.01); *H04L 5/0039* (2013.01); *H04L 5/0041* (2013.01); *H04L 5/0053* (2013.01); *H04L 5/0007* (2013.01); *H04L 5/0037* (2013.01)

(58) Field of Classification Search
CPC . H04W 72/042; H04L 5/0053; H04L 5/0039; H04L 5/0041; H04L 5/0007; H04L 5/0037
USPC .......................................................... 370/329
See application file for complete search history.

(56) References Cited

U.S. PATENT DOCUMENTS

2013/0044727 A1\*   2/2013   Nory et al. .................... 370/330

OTHER PUBLICATIONS

International Search Report for International Application No. PCT/IB2013/058845 mailed Jun. 5, 2014, 5 pages.
(Continued)

*Primary Examiner* — Ricky Ngo
*Assistant Examiner* — Richard Chang
(74) *Attorney, Agent, or Firm* — Myers Bigel & Sibley, P.A.

(57) ABSTRACT

Methods of operating a network node are provided. Various embodiments may provide methods of processing enhanced physical downlink control channel (ePDCCH) information by a network node of a radio telecommunications system. The methods may include differentiating between sets of physical resource block (PRB) pairs in an ePDCCH control region when defining blind decoding candidates. Moreover, the methods may include scheduling a resource for a User Equipment (UE) in response to differentiating between the sets of PRB pairs. Related network nodes and UEs are also described.

27 Claims, 25 Drawing Sheets

(56) References Cited

OTHER PUBLICATIONS

Panasonic: "ePDCCH search space design", 3GPP Draft; R1-123289_CLEAN, 3$^{rd}$ Generation Partnership Project (3GPP), Mobile Competence Centre; vol. RAN WG1, no. Qingdao, China, Aug. 5, 2012; 650 Route des Lucioles—Sophia Antipolis, Valbonne—France; 7 pages. Retrieved from the Internet: URL:http://www.3gpp.org/ftp/tsg_ran/WG1_RL1/TSGR1_70/Docs/.

Interdigital et al: "Way Forward on ePDCCH resource structure", 3GPP Draft; R1-123956_WF on EPDCCH Resource Structure, 3$^{rd}$ Generation Partnership Project (3GPP), Mobile Competence Centre; vol. RAN WG1, no. Qingdao, China, Aug. 16, 2012; 650 Route des Lucioles—Sophia Antipolis, Valbonne—France; 2 pages. Retrieved from the Internet: URL:http://www.3gpp.org/ftp/tsg_ran/WG1_RL1/TSGR1_70/Docs/.

Nokia et al: "Considerations on search spaces", 3GPP Draft; R1-123653 EPDCCH Search Space, 3$^{rd}$ Generation Partnership Project (3GPP), Mobile Competence Centre; vol. RAN WG1, no. Qingdao, China, Aug. 13-17, 2012; 650 Route des Lucioles—Sophia Antipolis, Valbonne—France; 7 pages. Retrieved from the Internet: URL:http://www.3gpp.org/ftp/tsg_ran/WG1_RL1/TSGR1_70/Docs/.

Ericsson et al: "ePDCCH Search Space", 3GPP Draft; R1-124150, 3$^{rd}$ Generation Partnership Project (3GPP), Mobile Competence Centre; vol. RAN WG1, no. San Diego, Sep. 29, 2012; 650 Route des Lucioles—Sophia Antipolis, Valbonne—France; 6 pages. Retrieved from the Internet: URL:http://www.3gpp.org/ftp/tsg_ran/WG1_RL1/TSGR1_70/Docs/.

* cited by examiner

METHODS OF PROCESSING ENHANCED PHYSICAL DOWNLINK CONTROL CHANNEL INFORMATION INCLUDING DIFFERENTIATING BETWEEN SETS OF PHYSICAL RESOURCE BLOCK PAIRS, AND RELATED NETWORK NODES AND USER EQUIPMENTS

CLAIM OF PRIORITY

The present application claims the benefit of U.S. Provisional Patent Application Ser. No. 61/707,285, filed on Sep. 28, 2012, entitled ePDCCH Blind Decode Partitioning and Search Candidate Hashing, the disclosure of which is incorporated herein in its entirety by reference.

TECHNICAL FIELD

The present disclosure is directed to communications and, more particularly, to methods of processing enhanced Physical Downlink Control Channel (ePDCCH) information, and related network nodes and user equipments.

BACKGROUND

Third Generation Partnership Project (3GPP) Long Term Evolution (LTE) technology is a mobile broadband wireless communication technology in which transmissions from base stations (e.g., evolved Node Bs (eNBs)) to mobile stations (e.g., User Equipments (UEs)) are sent using Orthogonal Frequency Division Multiplexing (OFDM). OFDM splits a signal into multiple parallel sub-carriers in frequency. The basic unit of transmission in LTE is a Resource Block (RB), which, in its most common configuration, includes twelve (12) subcarriers and seven (7) OFDM symbols (which may provide one (1) slot). A unit of one (1) subcarrier and one (1) OFDM symbol is referred to as a Resource Element (RE), which is illustrated in FIG. 1A. Thus, an RB may include eighty-four (84) REs. Referring to FIG. 1B, an LTE radio subframe includes multiple RBs in frequency, with the number of RBs determining the bandwidth of the system and two (2) slots in time. Furthermore, the two (2) RBs in a subframe that are adjacent in time are denoted as an RB pair.

In the time domain, LTE downlink transmissions are organized into radio frames of ten (10) milliseconds (ms), each radio frame consisting of ten (10) equally-sized subframes of length $T_{subframe}$=one (1) ms. The signal transmitted by the eNB in a downlink (the link carrying transmissions from the eNB to the UE) subframe may be transmitted from multiple antennas and the signal may be received at a UE that has multiple antennas. The radio channel distorts the transmitted signals from the multiple antenna ports. To demodulate any transmissions on the downlink, a UE relies on Reference Symbols (RS) that are transmitted on the downlink. These RSs and their position in the time-frequency grid are known to the UE and hence can be used to determine channel estimates by measuring the effect of the radio channel on these symbols.

Messages transmitted over the radio link to users can be broadly classified as control messages or data messages. Control messages are used to facilitate the proper operation of the system, as well as proper operation of each UE within the system. Control messages could include commands to control functions such as the transmitted power from a UE, signaling of RBs within which the data is to be received by the UE or transmitted from the UE, and so on.

Examples of control messages are the Physical Downlink Control Channel (PDCCH), which, for example, carries scheduling information and power control messages; the physical HARQ indicator channel (PHICH), which carries ACK/NACK in response to a previous uplink transmission; and the Physical Broadcast Channel (PBCH), which carries system information. Also, primary and secondary synchronization signals can be seen as control signals (PSS/SSS) with fixed locations and periodicity in time and frequency so that UEs that initially access the network can find them and synchronize.

The PBCH is not scheduled by a PDCCH transmission but has a fixed location relative to the primary and secondary synchronization signals (PSS/SSS). Therefore, the UE can receive the system information transmitted in BCH before it is able to read the PDCCH.

In LTE Release 10 (Rel.10 or Rel-10), all control messages to UEs are demodulated using the Common Reference Signals (CRS). Hence, they have a cell wide coverage to reach all UEs in the cell without having knowledge about their position. An exception is the PSS and SSS, which are stand-alone and do not need reception of CRS before demodulation. The first one to four (1-4) OFDM symbols, depending on the configuration, in a subframe are reserved to contain such control information, as illustrated in FIGS. 1B and 1C. Control messages could be categorized into those types of messages that need to be sent only to one (1) UE (i.e., UE-specific control) and those that need to be sent to all UEs or some subset of UEs numbering more than one (i.e., common control) within the cell being covered by the eNB.

Control messages of PDCCH type are demodulated using CRS and transmitted in multiples of units called Control Channel Elements (CCEs), where each CCE contains thirty-six (36) REs. A PDCCH may have Aggregation Level (AL) of 1, 2, 4 or 8 CCEs to allow for link adaptation of the control message. Furthermore, each CCE is mapped to nine (9) Resource Element Groups (REG) consisting of four (4) RE each. These REGs are distributed over the whole system bandwidth to provide frequency diversity for a CCE. Hence, a PDCCH, which consists of up to eight (8) CCEs, may span the entire system bandwidth in the first one to four (1-4) OFDM symbols, depending on the configuration. For example, FIG. 1C illustrates the mapping of one (1) CCE belonging to a PDCCH to a control region that spans a whole system bandwidth.

After channel coding, scrambling, modulation and interleaving of the control information, the modulated symbols are mapped to the resource elements in the control region. As described herein, CCEs have been defined, where each CCE maps to thirty-six (36) REs. By choosing the aggregation level, link-adaptation of the PDCCH obtained. In total, there are $N_{CCE}$ CCEs available for all the PDCCH to be transmitted in the subframe, and the number $N_{CCE}$ varies from subframe to subframe, depending on the number of control symbols n and the number of configured PHICH resources.

As $N_{CCE}$ varies from subframe to subframe, the terminal would need to blindly determine the position as well as the number of CCEs used for its PDCCH, which can be a computationally intensive decoding task. Therefore, some restrictions in the number of possible blind decodings a terminal needs to go through have been introduced in LTE Release 8 (Rel.8 or Rel-8). For instance, the CCEs are numbered and CCE aggregation levels of size K can only start on CCE numbers evenly divisible by K, as illustrated in FIG. 1D. As an example, FIG. 1D illustrates CCE aggregation showing Aggregation Levels (ALs) 8, 4, 2, and 1.

The set of CCE where a terminal (e.g., a UE) needs to blindly decode and search for a valid PDCCH is called the UE's search space. This is the set of CCEs on an AL a terminal should monitor for scheduling assignments or other control information. In each subframe and on each AL, a terminal will attempt to decode all the PDCCHs that can be formed from the CCEs in its search space. If a Cyclic Redundancy Check (CRC) checks, then the content of the PDCCH is assumed to be valid for the terminal and it further processes the received information. Often, two (2) or more terminals will have overlapping search spaces, and the network has to select one (1) of them for scheduling of the control channel. When this happens, the non-scheduled terminal is said to be blocked. The search spaces for a UE vary pseudo-randomly from subframe to subframe to reduce/minimize this blocking probability. Moreover, FIG. 1E is a flowchart illustrating processing steps of all the PDCCHs to be transmitted in a subframe. For example, FIG. 1E illustrates that a PDCCH message may be structured into CCEs (Block 101). Control information may then be scrambled and modulated (Block 102). Layer mapping and/or transmit diversity operations may optionally be performed (Block 103). Quadruplex-based interleaving may be performed (Block 104). A cyclic shift may be performed based on a cell identification (Block 105). Moreover, mapping to REGs may be performed (Block 106).

In LTE Release 11 (Rel.11 or Rel-11), it has been agreed to introduce UE-specific transmission for control information in the form of enhanced control channels by allowing the transmission of generic control messages to a UE using such transmissions based on UE-specific reference signals and by placement in the data region, as illustrated in FIG. 1F. This is commonly known as the enhanced PDCCH (ePDCCH), enhanced PHICH (ePHICH), and so on. For the enhanced control channel in Rel.11, it has been agreed to use antenna ports p∈{107, 108, 109, 110} for demodulation, i.e., the same antenna ports that are used for Physical Downlink Shared Channel (PDSCH) transmission using UE-specific Reference Symbols (RSs). This enhancement means that precoding gains can be achieved also for the control channels. Another benefit is that different PRB pairs (or enhanced control regions, see FIG. 1I) can be allocated to different cells or different transmission points within a cell, and thereby inter-cell or inter-point interference coordination between control channels can be achieved. This is especially useful for an HetNet scenario.

FIG. 1F illustrates a downlink subframe showing ten (10) Resource Block (RB) pairs and a configuration of three (3) ePDCCH regions (111, 112, 113) having a size of one (1) Physical Resource Block (PRB) pair each. The remaining RB pairs can be used for Physical Downlink Shared Channel (PDSCH) transmissions.

The same enhanced control region (see FIG. 1I) can be used in different transmission points within a cell or belong to different cells, that are not highly interfering with each other. A typical case is the shared-cell scenario, where a macro cell contains lower-power pico nodes within its coverage area, having (or being associated with) the same synchronization signal/cell ID.

For example, FIG. 1G illustrates a heterogeneous network scenario, where the dashed line in FIG. 1G indicates a macro cell coverage area 120, and 121, 122, and 123 correspond to the coverage areas of three (3) pico nodes 131, 132, and 133, respectively. In a shared-cell scenario, pico node coverage areas 121, 122, and 123 and macrocell coverage area 120 have the same cell ID, e.g., the same synchronization signal (i.e., transmitted or being associated with the same synchronization signal).

In pico nodes that are geographically separated, such as pico nodes 132 and 133 in FIG. 1G, the same enhanced control region, i.e., the same PRBs used for the ePDCCH, can be re-used. In this manner, the total control channel capacity in the shared cell will increase because a given PRB resource is re-used, potentially multiple times, in different parts of the cell. This ensures that area splitting gains are obtained. For example, in FIG. 1H, pico nodes 132 and 133 share the enhanced control region, whereas pico node 131, due to the proximity to pico node 132, is at risk of interfering and is therefore assigned an enhanced control region that is non-overlapping. Interference coordination between pico nodes 131 and 132, or, equivalently, transmission points 131 and 132, within a shared cell is thereby achieved. In some cases, a UE may need to receive part of the control channel signaling from the macro cell and the other part of the control signaling from the nearby pico cell.

This area splitting and control channel frequency coordination is not possible with the PDCCH because the PDCCH spans the whole bandwidth. The PDCCH does not provide possibility to use UE-specific precoding because it relies on the use of CRS for demodulation.

FIG. 1H shows an ePDCCH, which, similar to the CCE in the PDCCH, is divided into multiple groups and mapped to one of the enhanced control regions 111 and 112. In FIG. 1H, the enhanced control region does not start at OFDM symbol zero, to accommodate simultaneous transmission of a PDCCH in the subframe. However, as described herein, there may be carrier types in future LTE releases that do not have a PDCCH, in which case the enhanced control region could start from OFDM symbol zero within the subframe.

FIG. 1I illustrates a downlink subframe showing a CCE belonging to an ePDCCH mapped to one of the enhanced control regions, to achieve localized transmission. Moreover, FIG. 1J illustrates a downlink subframe showing a CCE belonging to an ePDCCH mapped to multiple ones of the enhanced control regions, to achieve distributed transmission and frequency diversity or subband precoding.

Even if the enhanced control channel enables UE-specific precoding and such localized transmission as illustrated in FIG. 1I, it can, in some cases, be useful to be able to transmit an enhanced control channel in a broadcast, wide area coverage fashion. This is useful if the eNB does not have reliable information to perform precoding towards a certain UE, and then a wide area coverage transmission may be more robust.

Another case is when the particular control message is intended for more than one UE, and UE-specific precoding cannot be used. An example is the transmission of the common control information using PDCCH (i.e., in the common search space (CSS)).

In any of these cases, a distributed transmission over enhanced control regions can be used. For example, FIG. 1J illustrates that four (4) parts 141-444 belonging to the same ePDCCH are distributed over the enhanced control regions.

It has been agreed in the 3GPP ePDCCH development that both distributed and localized transmission of an ePDCCH should be supported corresponding to FIGS. 1J and 1I, respectively.

When distributed transmission is used, then it may also be beneficial if antenna diversity can be achieved to increase/maximize the diversity order of an ePDCCH message. On the other hand, sometimes only wideband channel quality and wideband precoding information is available at the eNB for which it could be useful to perform a distributed transmission but with UE-specific, wideband, precoding.

To accommodate distributed transmission of enhanced control channels as well as supporting multiple options for localized transmission, a set of PRB pairs distributed in frequency may have to be allocated for the enhanced control region. To support higher control channel capacity than provided by a single set of PRB pairs, multiple sets may be allocated for the enhanced control region. This allocation may be done UE-specifically. In other words, different allocations for different UEs may be allocated simultaneously. Because PRB pairs used for PDSCH transmission often are allocated in terms of Resource Block Groups (RBGs) (i.e., groups of PRB pairs contiguous in frequency), it may be beneficial to limit the number of RBGs containing the enhanced control region for a given capacity. This is achieved by allocating multiple sets of PRB pairs from the same RBG. The group of RBGs forming the multiple of sets is referred to as a cluster. Even though a PRB pair is part of the enhanced control region, it may be used for PDSCH if no other transmissions take place. The described division of resources is illustrated in FIG. 1K.

For example, FIG. 1K illustrates a definition of sets and clusters, where the number of sets equals the Resource Block Group (RBG) size. The number of RBGs per cluster is in this example set to four (4), which corresponds to four (4) PRB pairs per set. A distributed ePDCCH transmission is mapped within one (1) set. If additional control resources are needed, then additional clusters can be configured.

Accordingly, in LTE, an enhanced control channel referred to as the ePDCCH is being defined. A UE uses blind decoding techniques to receive ePDCCH messages with several blind decoding candidates being tested. In Rel-8, the assignment of a number of blind decoding candidates for each aggregation level of the PDCCH is known to the UE. For the ePDCCH, the entire space over which an ePDCCH may be received is partitioned into sets. Making this partition known to UEs via Radio Resource Control (RRC) signaling can lead to significant extra overhead. Moreover, specification of these values as is done in Rel-8 is not simple, due to the number of combinations of sets of potentially different sizes that may be configured for a UE.

Furthermore, frequency multiplexing gains sometimes suffer when blind decoding candidates tested by a UE occur consecutively. Also, when two sets configured for a UE are fully or partially overlapping, the currently-used hash function in Rel-8 does not allow different blind decoding candidates for these sets.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

Various embodiments may provide methods of processing enhanced physical downlink control channel (ePDCCH) information by a network node of a radio telecommunications system. The methods may include differentiating between sets of physical resource block (PRB) pairs in an ePDCCH control region when defining blind decoding candidates. Moreover, the methods may include scheduling a resource for a user equipment in response to differentiating between the sets of PRB pairs. By differentiating between the sets of PRB pairs in the ePDCCH control region when defining blind decoding candidates, various embodiments may use a network node to define ePDCCH blind decoding candidates in a format/manner that improves distribution of blind decoding candidates and/or searching of blind decoding candidates by a UE.

In various embodiments, differentiating between the sets of PRB pairs may include assigning blind decoding candidates to the sets of PRB pairs in proportion to sizes of the respective sets of PRB pairs. Accordingly, the blind decoding candidates may be automatically distributed proportionally to the resources in the sets of PRB pairs, which may conserve signaling overhead and memory at a network node/UE by obviating the need to store lengthy tables.

According to various embodiments, differentiating between the sets of PRB pairs may include performing a randomization procedure that varies a starting position for a list of blind decoding candidates such that overlapping ones of the sets of PRB pairs have different starting positions. Such randomization can allow flexibility in deployments where a UE may either receive data from multiple transmission points or dynamically switch between them.

In various embodiments, differentiating between the sets of PRB pairs may include defining a blind decoding candidate using an identification of a particular one of the sets of PRB pairs. Moreover, defining the blind decoding candidate may include defining the blind decoding candidate such that two consecutive blind decoding candidates considered by the user equipment occur in different PRB pairs. Locating consecutive blind decoding candidates in separate PRB pairs may allow for frequency selective scheduling gains.

According to various embodiments, differentiating between the sets of PRB pairs may include ordering the sets of PRB pairs differently with respect to different ones of a plurality of user equipments that use resources of the ePDCCH control region. This may allow performance improvements by equalizing the average utilization of PRB pairs being used for the ePDCCH control region.

In various embodiments, differentiating between the sets of PRB pairs may include indexing the sets of PRB pairs differently with respect to different ones of a plurality of user equipments that use resources of the ePDCCH control region, such that each of the plurality of user equipments searches for the blind decoding candidates using a different order of the sets of PRB pairs despite all of the plurality of user equipments using identical set numbers for the sets of PRB pairs.

Network nodes of a radio telecommunications system, according to various embodiments, may be provided. The network nodes may include a transceiver configured to communicate using an enhanced physical downlink control channel (ePDCCH). Moreover, the network nodes may include a processor configured to differentiate between sets of physical resource block (PRB) pairs in an ePDCCH control region when defining blind decoding candidates (Xs). The processor may also be configured to schedule a resource for a user equipment in response to differentiating between the sets of PRB pairs.

A User Equipment (UE) of a radio telecommunications system, according to various embodiments, may be provided. The UE may include a transceiver configured to receive an enhanced physical downlink control channel (ePDCCH) message from a network node, using an ePDCCH. The UE may also include a processor configured to search blind decoding candidates defined with respect to differentiation between sets of physical resource block (PRB) pairs in an ePDCCH control region, in response to receiving the ePDCCH message from the network node.

Methods of operating a User Equipment (UE) of a radio telecommunications system may include receiving an enhanced physical downlink control channel (ePDCCH)

message from a network node (1100), using an ePDCCH. The methods may include searching blind decoding candidates (Xs) defined with respect to differentiation between sets of physical resource block (PRB) pairs in an ePDCCH control region, in response to receiving the ePDCCH message from the network node (1100).

Accordingly, various embodiments may use a network node to define ePDCCH blind decoding candidates in a format/manner that improves distribution of the blind decoding candidates and/or searching of the blind decoding candidates by a UE. For example, the network node may allow a fixed number of blind decoding candidates to be partitioned between sets of PRB pairs. As an example, the blind decoding candidates may be automatically partitioned between the sets in direct proportion to the number of PRBs configured for each set, thus conserving signaling overhead and memory at the network node/UE by obviating the need to store lengthy tables. In another example, the network node may randomize search space candidate selection using PRB set numbers, to allow flexibility in certain types of deployments where the UE may either receive data from multiple transmission points or dynamically switch between them. Accordingly, blind decoding candidate conflicts may be reduced between two or more sets of PRB pairs that may overlap in frequency.

In yet another example, various embodiments may ensure that consecutively tested blind decoding candidates occur in different PRB pairs, thus ensuring that frequency selective scheduling gains can be accrued. Furthermore, a network may manage (e.g., via a network node) PRB pair set configurations with respect to UEs so that resource utilization on the ePDCCH is increased/maximized. For example, different ePDCCH set orderings/numberings may be used for different UEs.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the disclosure. In the drawings.

DETAILED DESCRIPTION

Figure 1A:
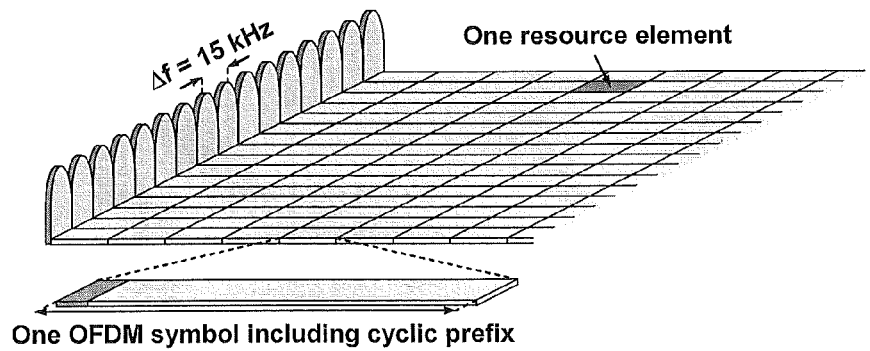
FIGS. 1A and 1B illustrate a Long Term Evolution (LTE) downlink physical resource and a downlink subframe, respectively.
Figure 1B:
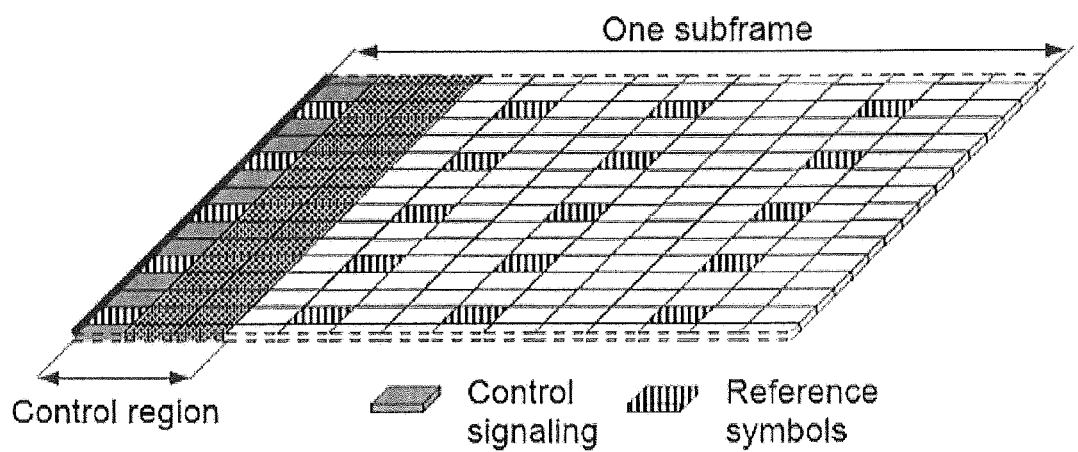
Figure 1C:
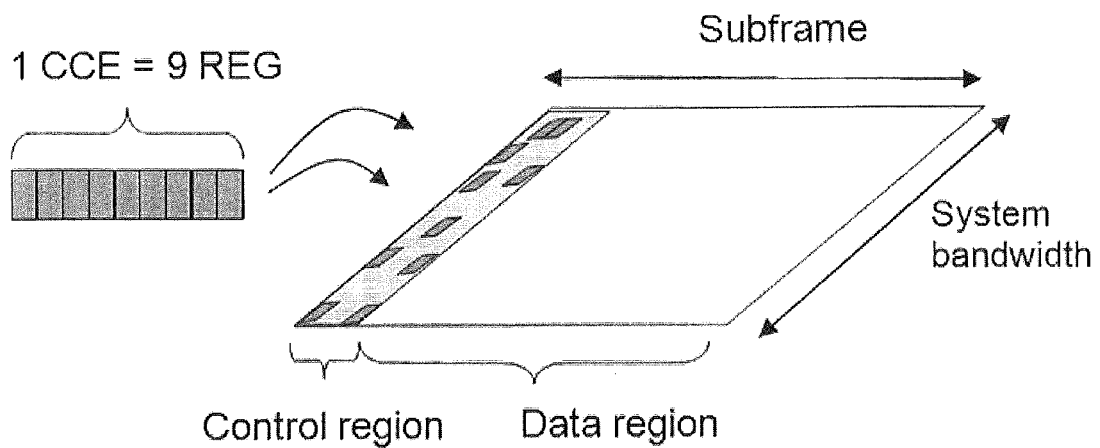
FIGS. 1C and 1D illustrate mapping of a Control Channel Element (CCE) and a CCE aggregation, respectively.
Figure 1D:
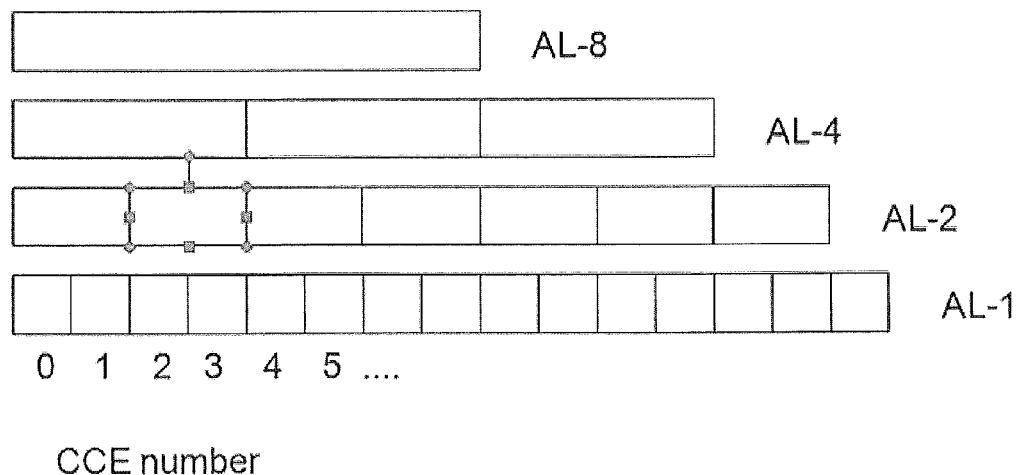
Figure 1E:
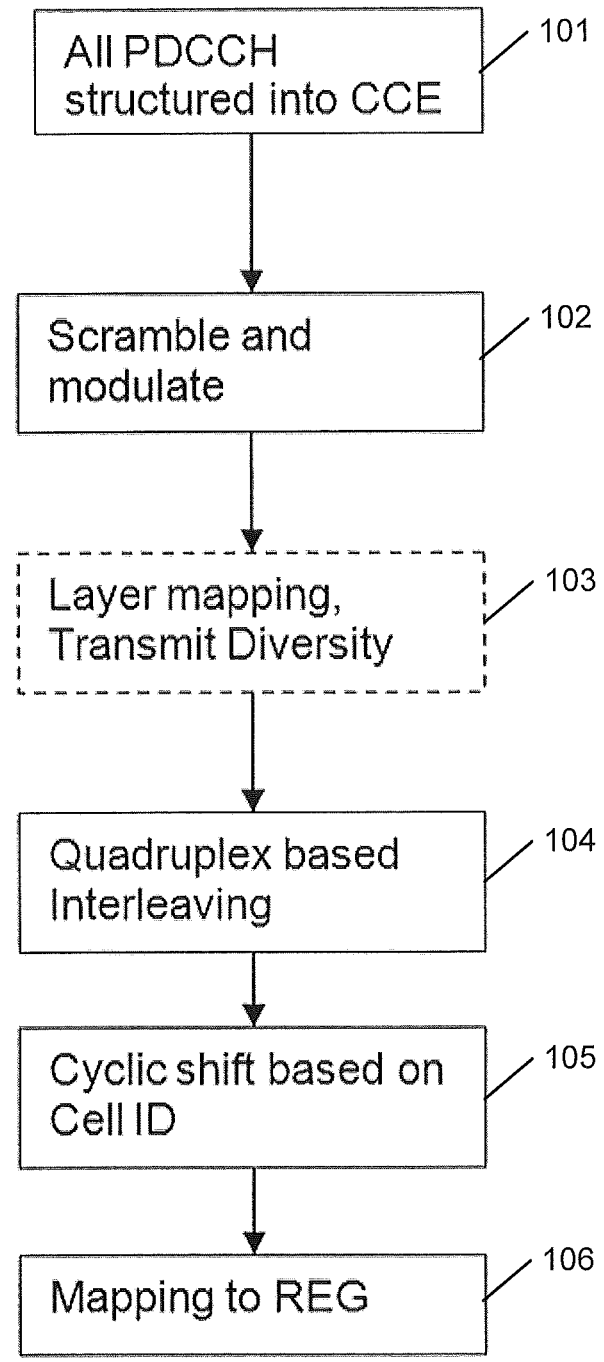
FIG. 1E is a flowchart illustrating PDCCH processing.
Figure 1F:
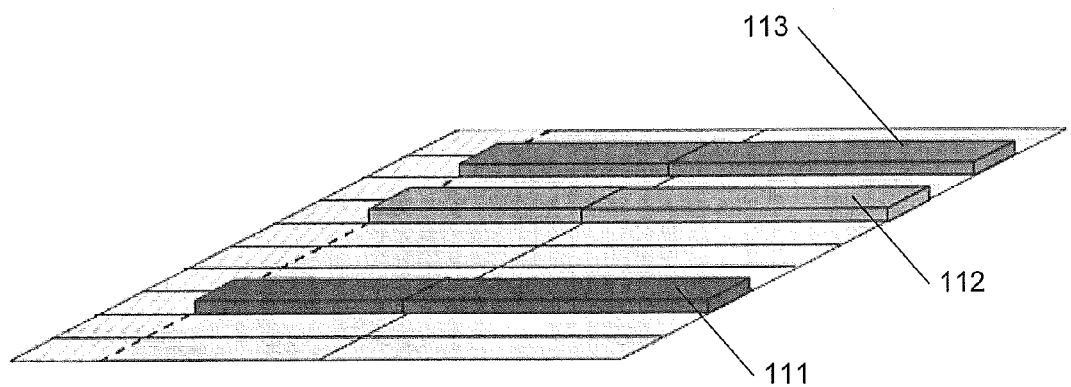
FIGS. 1F-1K illustrate examples of enhanced Physical Downlink Control Channel (ePDCCH) communications.
Figure 1G:
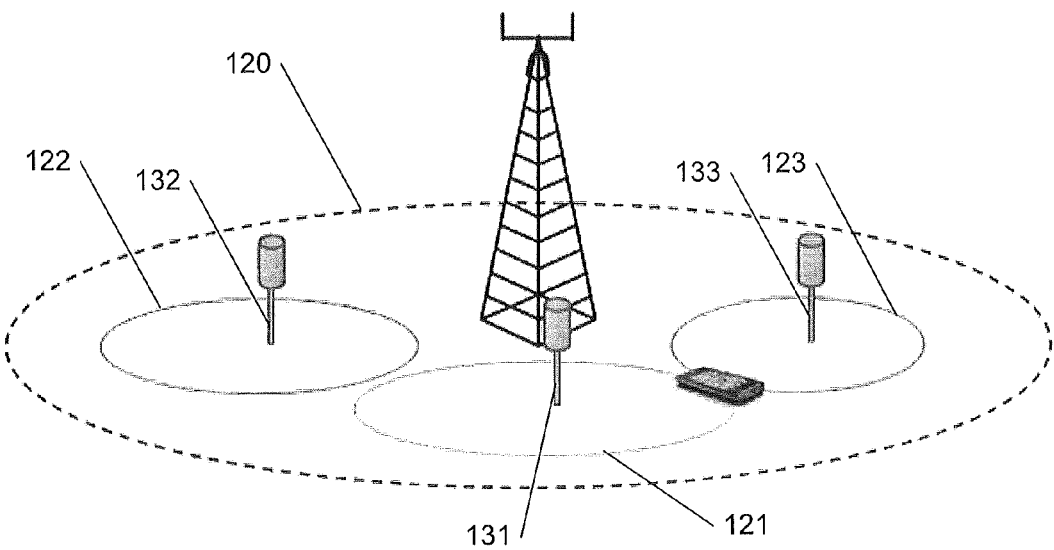
Figure 1H:
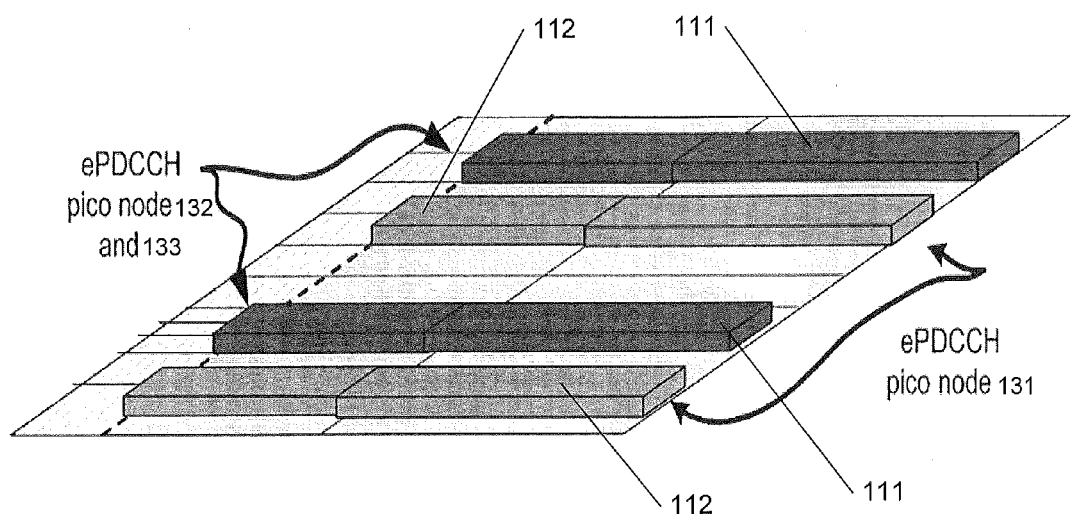
Figure 1I:
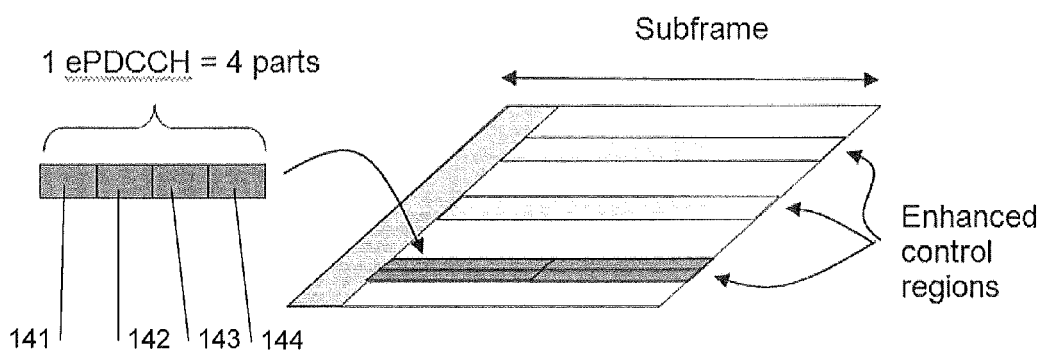
Figure 1J:
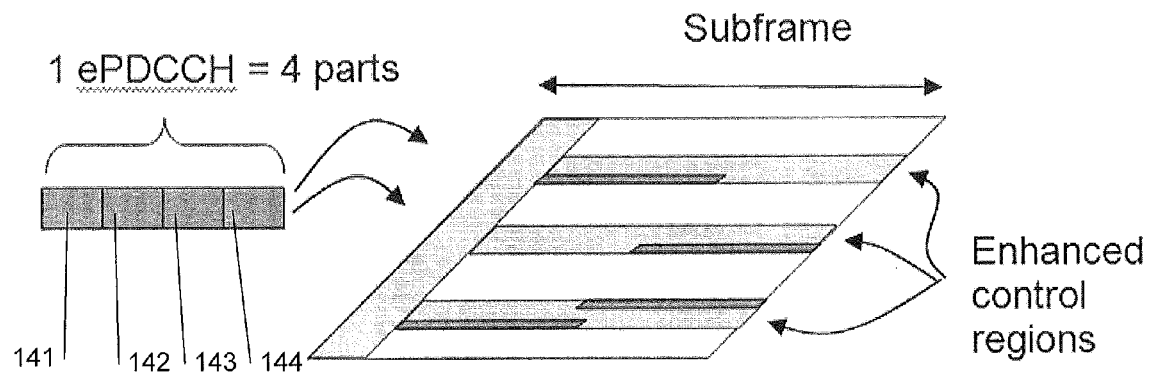
Figure 1K:
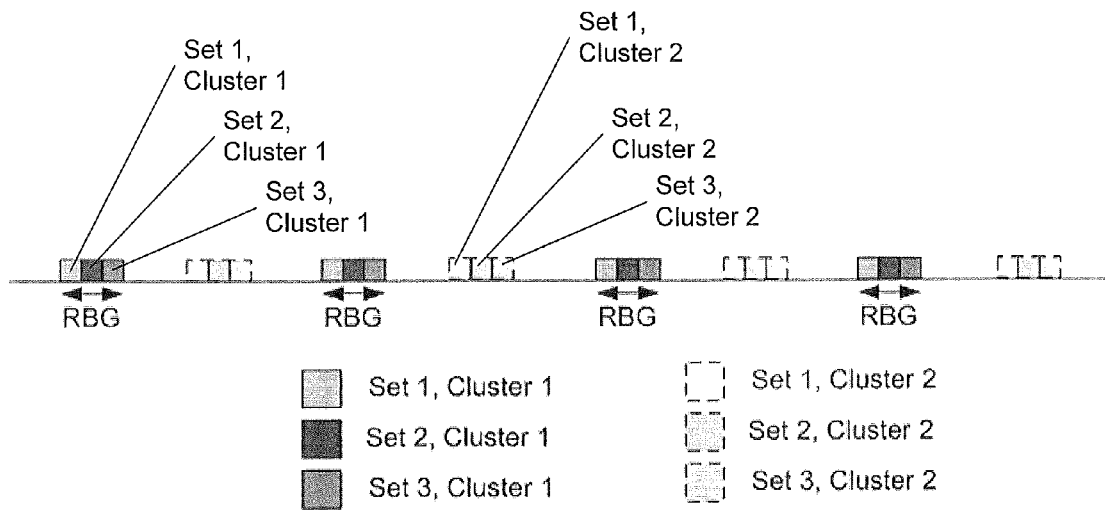

The present inventive concepts will now be described more fully hereinafter with reference to the accompanying drawings, in which examples of embodiments of the inventive concepts are shown. The inventive concepts may, however, be embodied in many different forms and should not be construed as limited to the embodiments set forth herein. Rather, these embodiments are provided so that this disclosure will be thorough and complete, and will fully convey the scope of the present inventive concepts to those skilled in the art. It should also be noted that these embodiments are not mutually exclusive. Components from one embodiment may be tacitly assumed to be present/used in another embodiment.

In the description of various embodiments, it is to be understood that the terminology used herein is for the purpose of describing particular embodiments only and is not intended to be limiting of the inventive concepts. Unless otherwise defined, all terms (including technical and scientific terms) used herein have the same meaning as commonly understood by one of ordinary skill in the art to which these inventive concepts belong. It will be further understood that teems, such as those defined in commonly used dictionaries, should be interpreted as having a meaning that is consistent with their meaning in the context of this specification and the relevant art and will not be interpreted in an idealized or overly formal sense unless expressly so defined herein.

It will be understood that, although the terms "first," "second," etc. may be used herein to describe various elements, these elements should not be limited by these terms. These terms are only used to distinguish one element from another. Thus, a "first" element could be termed a "second" element without departing from the teachings of the present embodiments.

When an element is referred to as being "connected," "coupled," "responsive," or variants thereof to another element, it can be directly connected, coupled, or responsive to the other element or intervening elements may be present. In contrast, when an element is referred to as being "directly connected," "directly coupled," "directly responsive," or variants thereof to another element, there are no intervening elements present. Like numbers refer to like elements throughout. Furthermore, "coupled," "connected," "responsive," or variants thereof as used herein may include wirelessly coupled, connected, or responsive. As used herein, the singular forms "a," "an," and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise," "comprising," "comprises," "include," "including," "includes," "have," "has," "having," or variants thereof are open-ended, and include one or more stated features, elements, steps, components or functions but do not preclude the presence or addition of one or more other features, elements, steps, components, functions or groups thereof. Furthermore, as used herein, the common abbreviation "e.g.," which derives from the Latin phrase "exempli gratia," may be used to introduce or specify a general example or examples of a previously mentioned item, and is not intended to be limiting of such item. The common abbreviation "i.e.," which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the disclosure may be embodied in hardware and/or in software (including firmware, resident software, micro-code, etc.) that runs on a processor such as a digital signal processor, which may collectively be referred to as "circuitry," "a module," or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the inventive concepts. Moreover, although some of the diagrams include arrows on communication paths to show a primary direction of communication, it is to be understood that communication may occur in the opposite direction to the depicted arrows.

For purposes of illustration and explanation only, these and other embodiments are described herein in the context of operating in a Radio Access Network (RAN) that communicates over radio communication channels with wireless terminals (also referred to as UEs). It will be understood, however, that present inventive concepts are not limited to such embodiments and may be embodied generally in any type of communication network. As used herein, a wireless terminal (also referred to as a UE) can include any device that receives data from a communication network, and may include, but is not limited to, a mobile telephone ("cellular" telephone), laptop/portable computer, pocket computer, hand-held computer, and/or desktop computer.

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. The radio network controller is typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP ($3^{rd}$ Generation Partnership Project) LTE (Long Term Evolution) is used in this disclosure to exemplify embodiments of inventive concepts, this should not be seen as limiting the scope of inventive concepts to only these systems. Other wireless systems, including WCDMA (Wideband Code Division Multiple Access), WiMax (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments disclosed herein.

Also note that terminology such as base station (also referred to as eNodeB or Evolved Node B) and wireless terminal (also referred to as UE or User Equipment) should be considering non-limiting and does not imply a certain hierarchical relation between the two. In general a base station (e.g., an "eNodeB") and a wireless terminal (e.g., a "UE") may be considered as examples of respective different communications devices that communicate with each other over a wireless radio channel. While embodiments discussed herein may focus on wireless transmissions in a downlink from an eNodeB to a UE, embodiments of inventive concepts may also be applied, for example, in the uplink.

Figure 13:
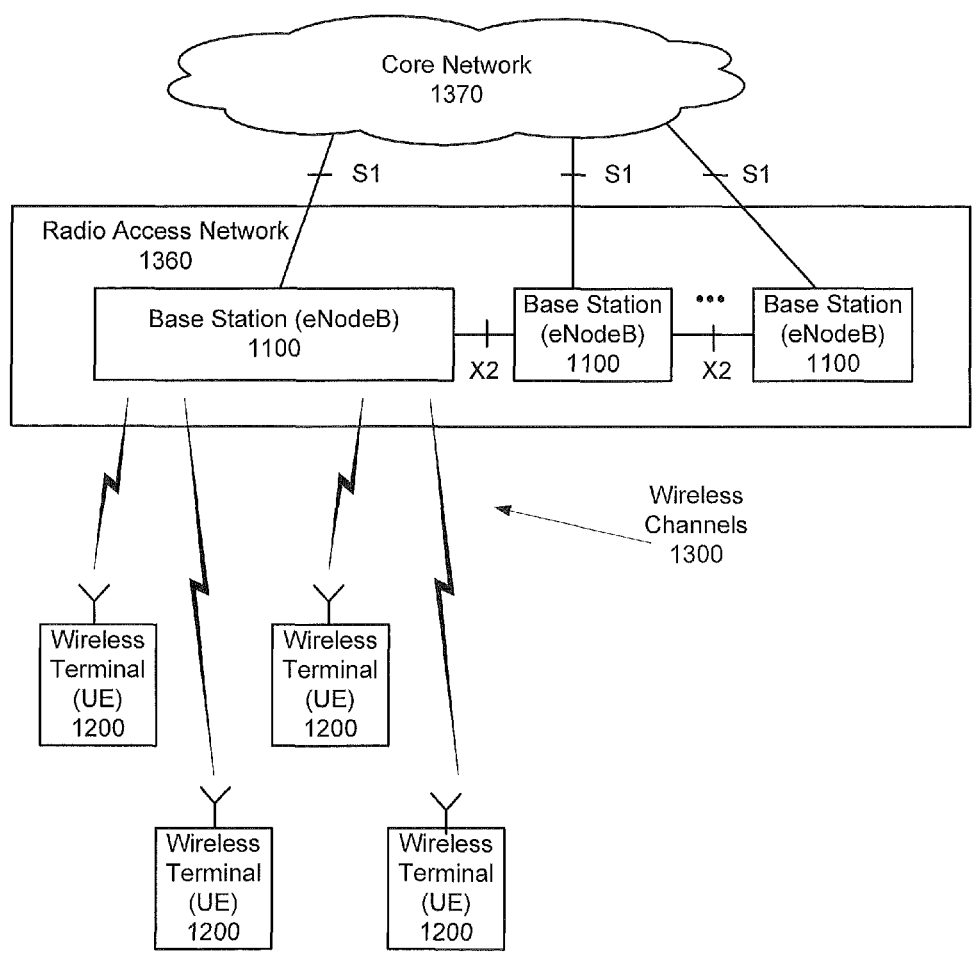
FIG. 13 is a block diagram of a communication system that is configured to operate according to some embodiments of present inventive concepts.

FIG. 13 is a block diagram of a communication system that is configured to operate according to some embodiments of present inventive concepts. An example RAN 1360 is shown that may be a Long Term Evolution (LTE) RAN. Radio base stations (e.g., eNodeBs) 1100 may be connected directly to one or more core networks 1370, and/or radio base stations 1100 may be coupled to core networks 1370 through one or more Radio Network Controllers (RNC). In some embodiments, functionality of a radio network controller(s) may be performed by radio base stations 1100. Radio base stations 1100 communicate over wireless channels 1300 with wireless terminals (also referred to as user equipment nodes or UEs) 1200 that are within their respective communication service cells (also referred to as coverage areas). The radio base stations 1100 can communicate with one another through an X2 interface and with the core network(s) 1370 through S1 interfaces, as is well known to one who is skilled in the art.

Figure 2A:
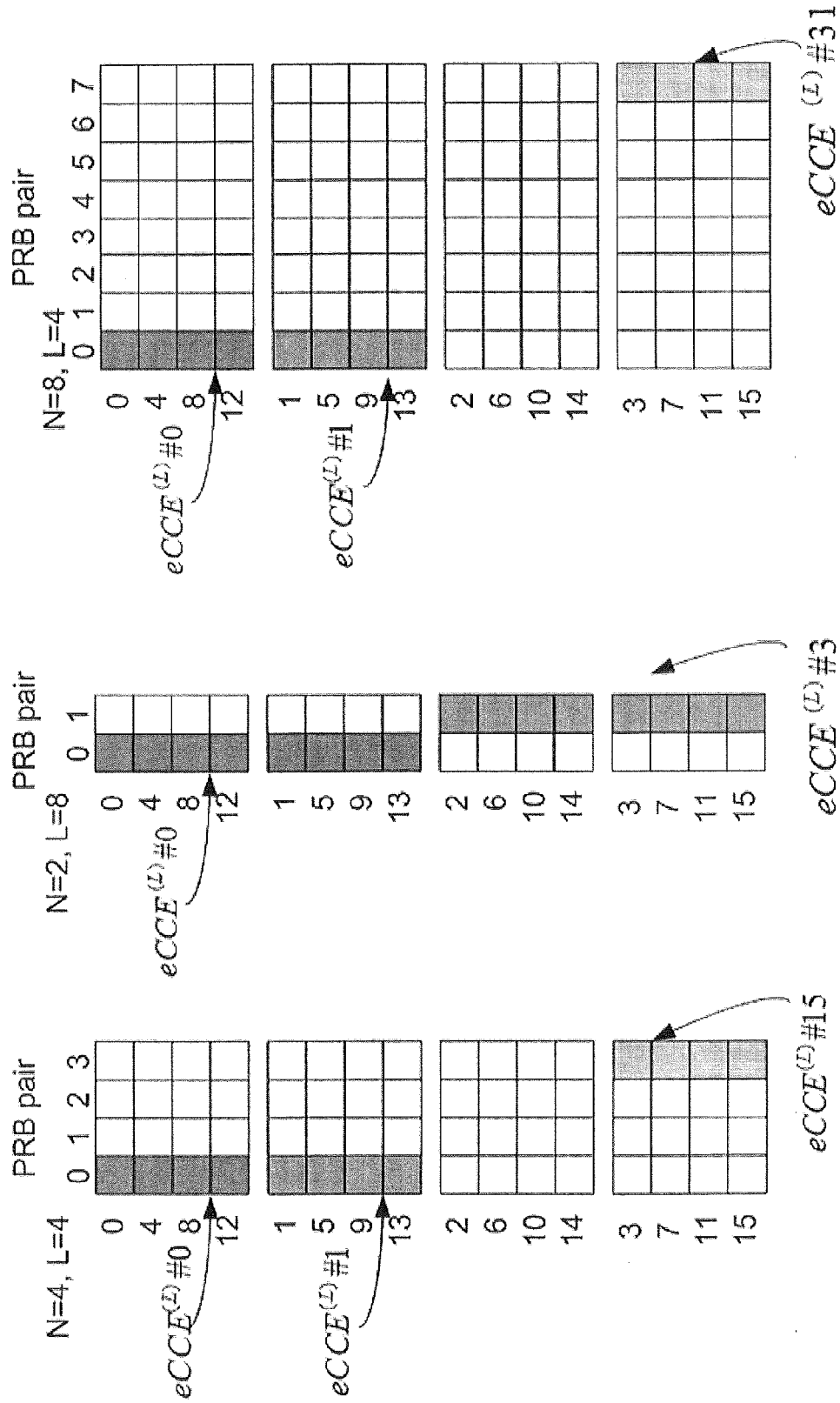
FIGS. 2A and 2B illustrate examples of enhanced Physical Downlink Control Channel (ePDCCH) sets with different numbers of PRB pairs for localized and distributed transmission, respectively, according to various embodiments.
Figure 2B:
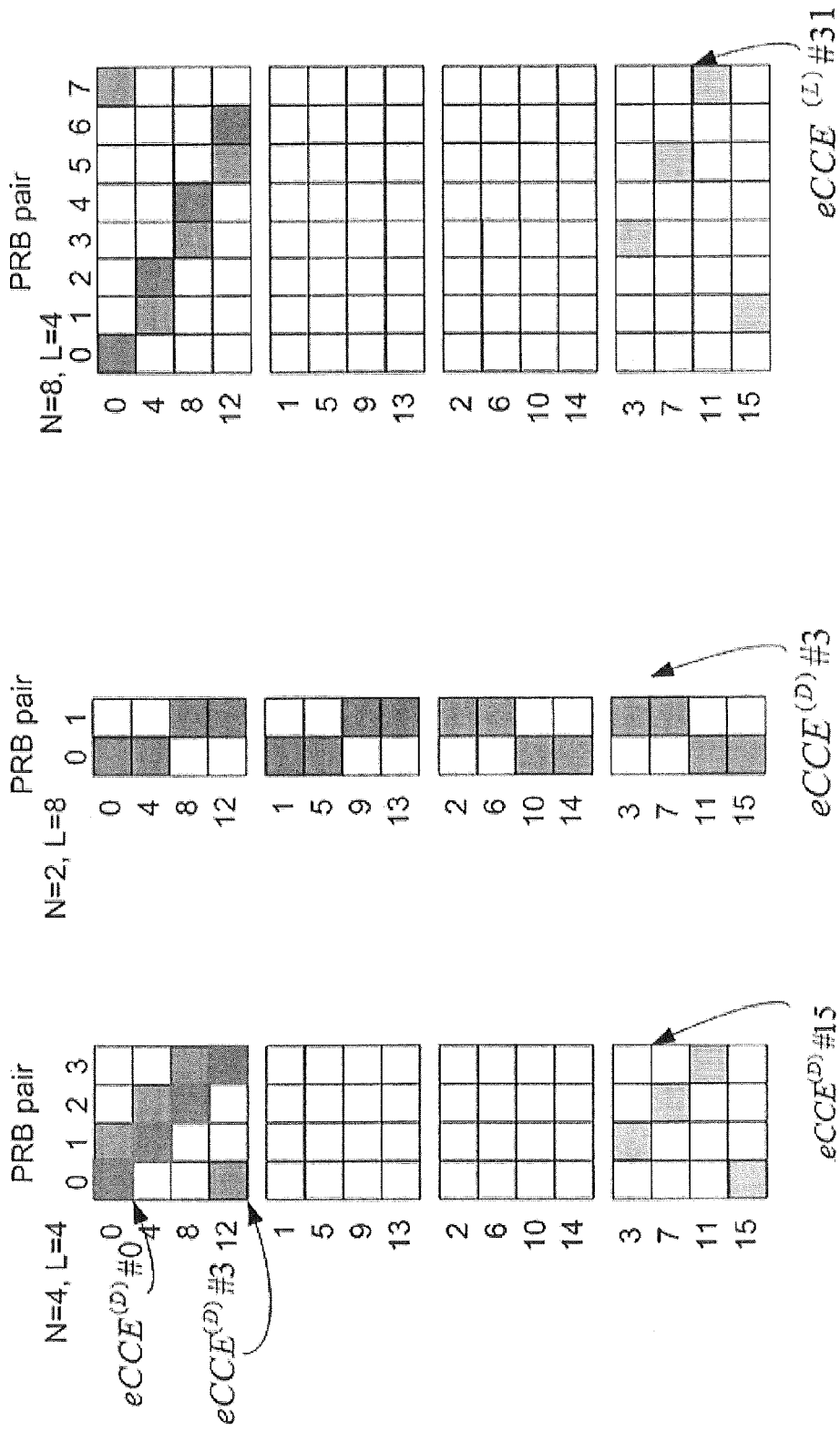

Referring now to FIGS. 2A and 2B, examples are illustrated of enhanced Physical Downlink Control Channel (ePDCCH) sets with different numbers of PRB pairs for localized and distributed transmission, respectively, according to various embodiments. An enhanced PDCCH (ePDCCH) control region may include up to K sets of Physical Resource Block (PRB), pairs with $K^D$ sets being allocated for distributed transmission and $K^L$ sets allocated for localized transmission, so that $K^D+K=K$. The $k^{th}$ distributed and localized sets may have different numbers of PRB pairs assigned to them. These may be denoted by $N_k^C$ and $N_k^C$, where k=0, 1, ..., $K^D-1$ for the distributed sets and k=0, 1, ..., $K^C-1$ for the localized sets.

An ePDCCH message can be transmitted (e.g., transmitted by the network node 1100 to the UE 1200) at multiple aggregation levels (i.e., as a collection of a different number of enhanced Control Channel Elements (eCCEs). An eCCE may be formed by collecting multiple extended Resource Element Groups (eREGs), which are the fundamental building blocks for the ePDCCH control region. In distributed transmission, the eREGs are spread across multiple PRB pairs, and for localized transmission, they are concentrated in one (1) or two (2) PRB pairs.

A set of eCCEs as shown in FIGS. 2A and 2B may be used together to send an ePDCCH message. The number of eCCEs used in a single message may be referred to as an Aggregation Level (AL). Four (4) or five (5) aggregation levels are typically used. For the latest release of Long Term Evolution (LTE) under development, it has been agreed to have four (4) aggregation levels for localized transmission and five (5) aggregation levels for distributed transmission. An example of search spaces for various aggregation levels for distributed and localized transmission is shown in FIGS. 2C and 2D, respectively.

Figure 2C:
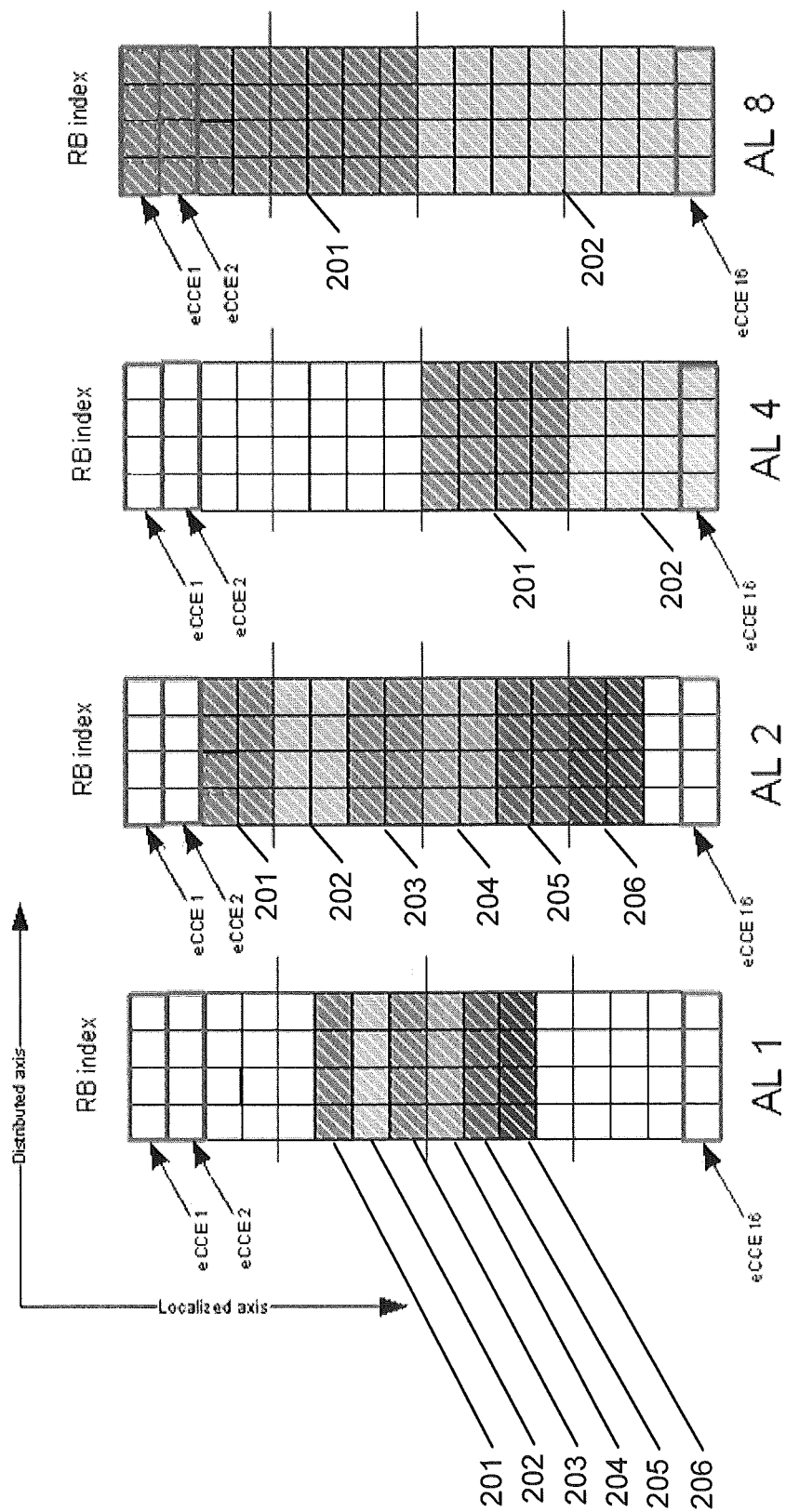
FIGS. 2C and 2D illustrate distributed and localized search spaces, respectively, according to various embodiments.
Figure 2D:
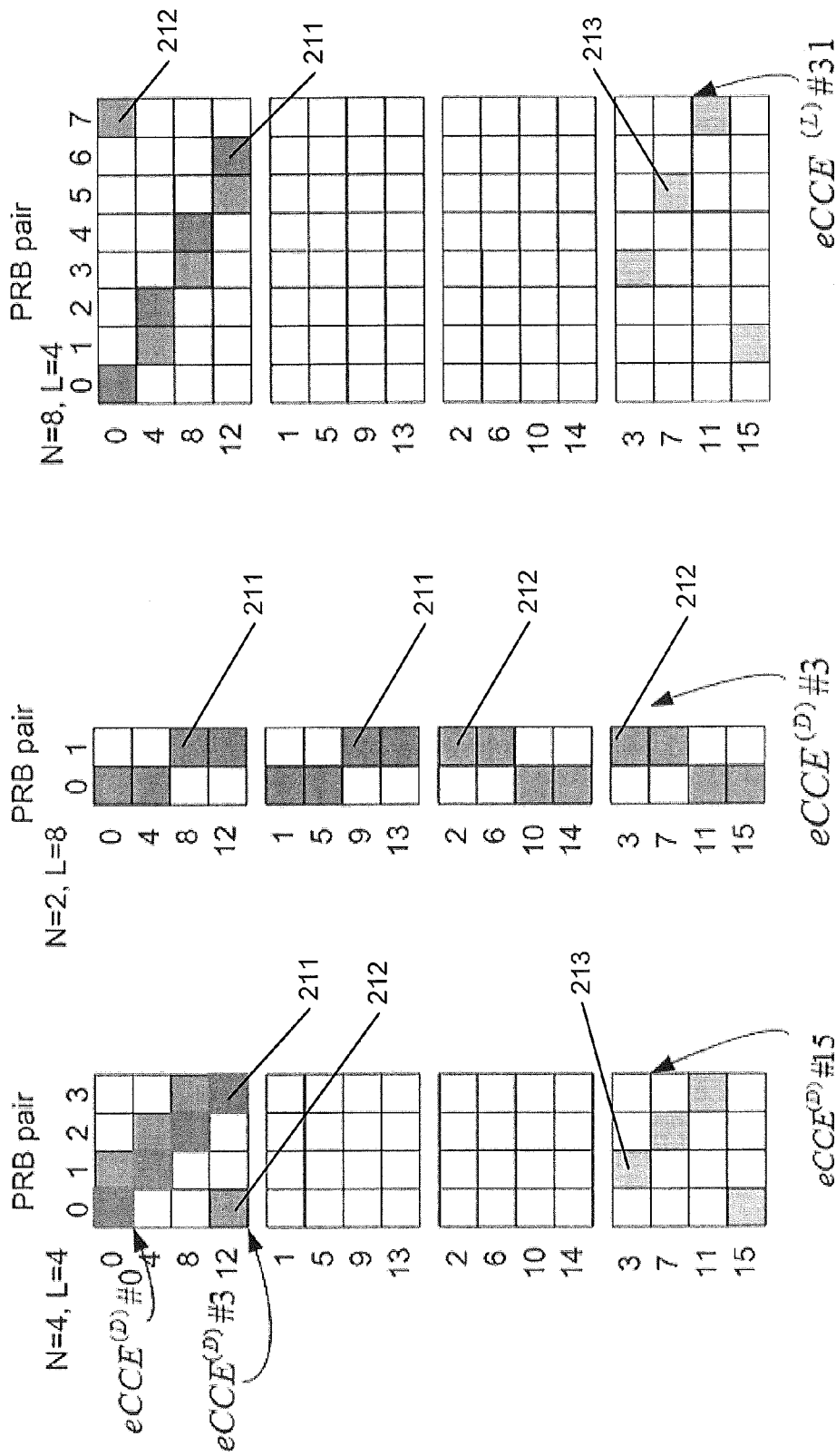

In particular, FIG. 2C illustrates distributed search spaces of four (4) different aggregation levels, in which ePDCCH candidates 201-206 are represented. The leftmost figure in FIG. 2C shows distributed allocations of AL=1, and the rightmost figure shows distributed allocations of AL=8. FIG. 2D illustrates localized search spaces of four (4) different aggregation levels, in which ePDCCH candidates 211-213 are represented. The leftmost figure in FIG. 2D shows distributed allocations of AL=1, and the rightmost figure shows distributed allocations of AL=8.

A fixed number of blind decoding candidates, $M^L$, may be assigned to an aggregation level L. For example, in Rel-8 of LTE, for a UE-specific search space, aggregation levels {1, 2, 4, 8} are assigned respective {6, 6, 2, 2} blind decoding candidates. These blind decoding candidates to be used by the UE for each aggregation level can vary between subframes in a pseudo-random manner. One of the problems for the ePDCCH is that the blind decoding candidates assigned to each aggregation level must be partitioned into sub-assignments for each of the configured sets because each set acts, in effect, as an independent search space. Furthermore, due to the possibility for each set to be of a different size and also of a different transmission type (localized or distributed), the optimal partitioning of blind decode candidates can be quite complicated.

Figure 3:
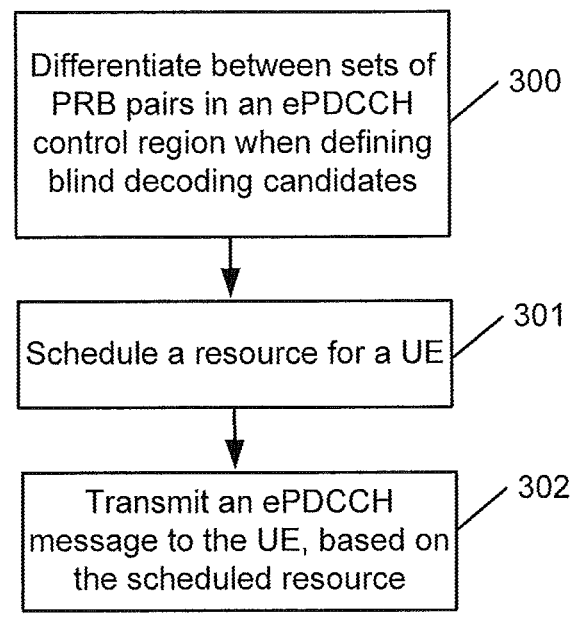
FIG. 3 is a flowchart illustrating operations of a network node, including differentiating between sets of PRB pairs in an ePDCCH control region when defining blind decoding candidates, according to various embodiments.

Various embodiments described herein, however, may use a network node to define ePDCCH blind decoding candidates in a format/manner that improves distribution of the blind decoding candidates and/or searching of the blind decoding candidates by a UE. For example, referring now to FIG. 3, a flowchart is provided illustrating operations of a network node when defining blind decoding candidates, according to various embodiments. The operations may include differentiating between sets of PRB pairs in an ePDCCH control region when defining blind decoding candidates (Block 300). The operations may further include scheduling (e.g., using a resource scheduler) a resource for a UE in response to Block 300's differentiation between the sets of PRB pairs (Block 301). It will be understood that various types of wireless communications resources may be scheduled for a UE, and the present disclosure is not intended to limit these various resources. Moreover, it will be understood that the operations may include transmitting an ePDCCH message to the UE, based on (e.g., in response to) the scheduled resource (Block 302).

A. Assignment of Blind Decoding Candidates

Figure 4:
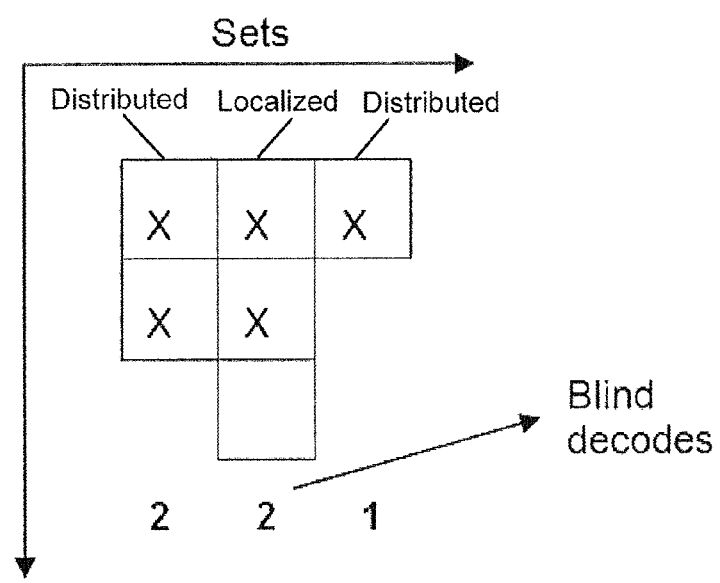
FIG. 4 illustrates a diagram of blind decode partitioning using proportional enumeration, according to various embodiments.

Referring now to FIG. 4, a diagram of blind decode partitioning using proportional enumeration is illustrated, according to various embodiments. Specifically, FIG. 4 illustrates that five (5) blind decoding candidates (Xs) are partitioned among K=3 sets that are configured with sizes [8, 4, 2] PRBs. For example, an array of K columns, one for each configured set, may be formed, with alternate columns representing distributed and localized sets. The length of the $k^{th}$ column is proportional to the fraction of the total PRBs assigned to the $k^{th}$ set and may be computed as $$\left\lfloor N_k \cdot M^L \bigg/ \sum_k N_k \right\rfloor,$$

where $M^L$ is the total number of blind decoding candidates (Xs) assigned to aggregation level L. Next, the $M^L$ blind decoding candidates (Xs) populate the array row-wise first so that each element of the array contains one (1) blind decoding candidate (X). The number of blind decoding candidates assigned to the $k^{th}$ set is the number of blind decoding candidates in the $k^{th}$ column. Accordingly, these operations may ensure that blind decoding candidates (Xs) are split (e.g., assigned, allocated, distributed, partitioned, and the like) proportionally to the resources in each of the sets, and that distributing at least one (1) blind decoding candidate (X) for each configured set is prioritized.

Figure 5:
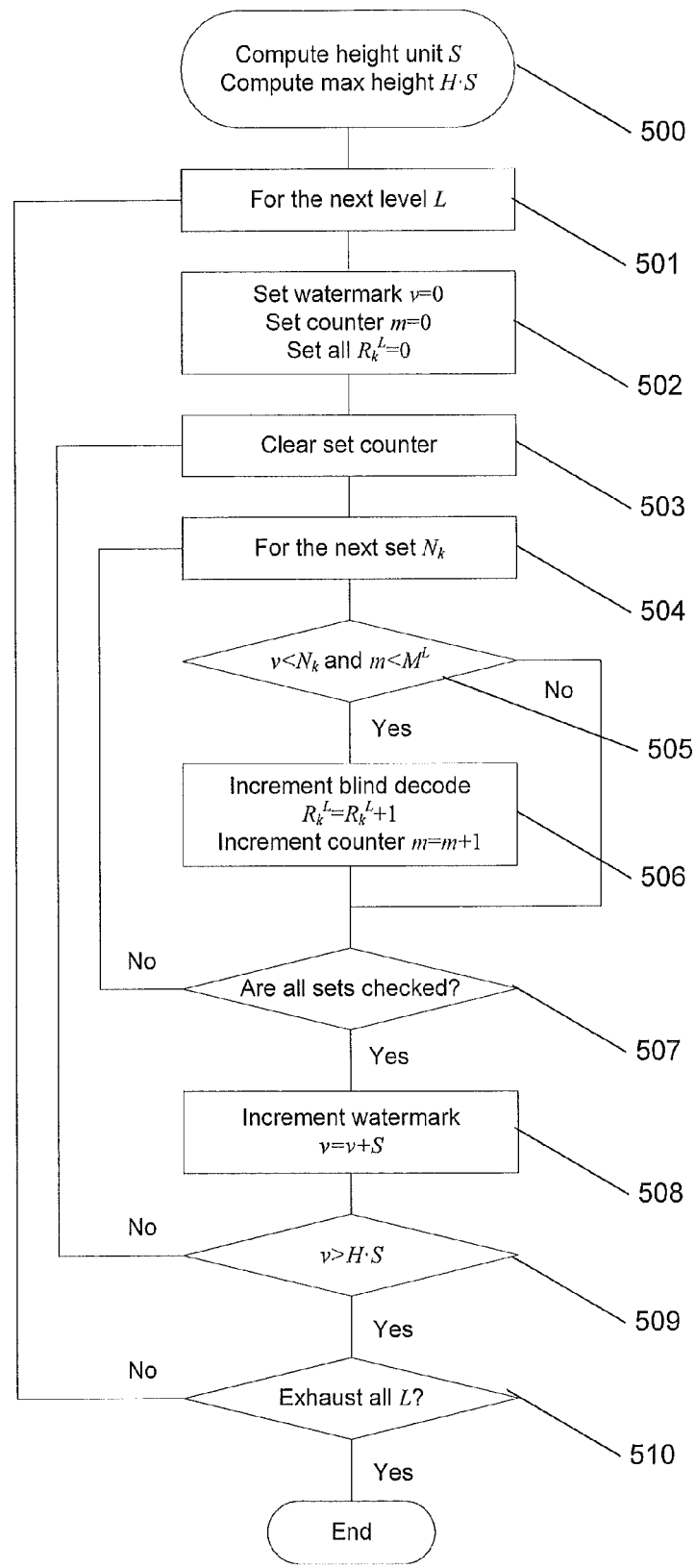
FIGS. 5, 6A, and 6B are flowcharts illustrating distributing blind decoding candidates to different sets of PRB pairs, according to various embodiments.
Figure 6A:
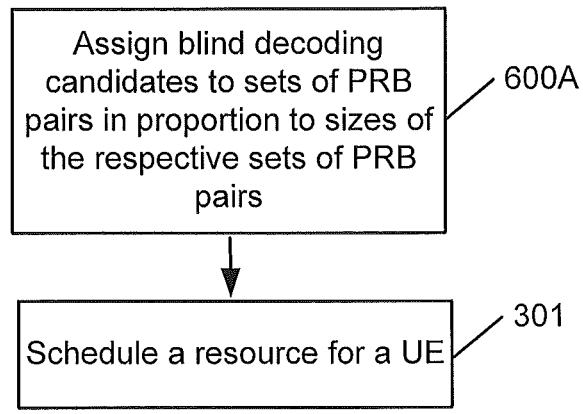
Figure 6B:
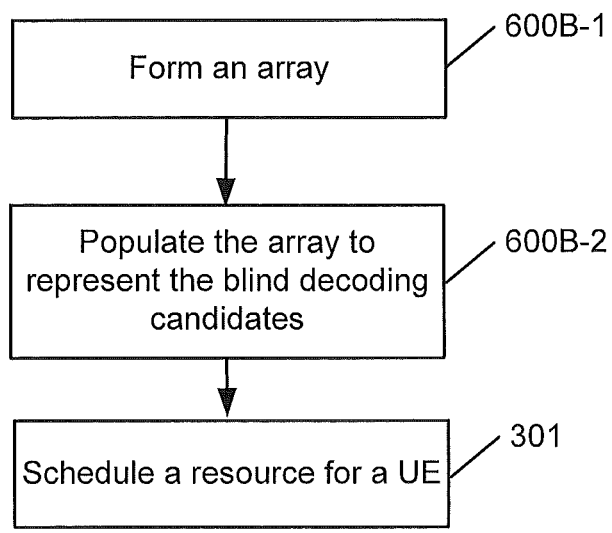

Referring now to FIGS. 5, 6A, and 6B, flowcharts are provided illustrating distributing blind decoding candidates to different sets of PRB pairs, according to various embodiments. For example, in FIG. 5, the number of sets assigned for distributed and localized transmission are denoted by $K^D$ and $K^C$, respectively, and the number of PRB pairs assigned to the $k^{th}$ distributed and localized sets are given by $N_k^D$ and $N_k^C$, respectively. The final blind decoding partitions are contained in $R_k^{D,L}$, where $k=0, 1, \ldots, K^D-1$, and $R_k^{C,L}$, where $k=0, 1, \ldots, K^C-1$. The following operations may then be performed:

Releases (e.g., before ePDCCH development), only a single set of PRB pairs was used (e.g., used in the control region). Moreover, Block 600A's assigning the blind decoding candidates may include assigning at least one blind decoding candidate to each of the sets of PRB pairs. Also, as the proportional assignment may be performed without using a mathematical division operation, the proportional assignment may not be a significant processing burden for the network node.

Referring to FIG. 6B, Block 600A's assignment of the blind decoding candidates in proportion to the sizes of the respective sets of PRB pairs may include forming an array representing the sets of PRB pairs (Block 600B-1). The sizes of the respective sets of PRB pairs may include the quantities of PRBs in the respective sets of PRB pairs. Assigning the blind decoding candidates may further include populating the array to represent the blind decoding candidates assigned to the respective sets of PRB pairs (Block 600B-2). Also, it will be understood that the operations illustrated in Blocks 600B-1 and 600B-2 may be performed to assign the blind decoding candidates (Xs) as illustrated in FIG. 4.

Accordingly, although the quantity and size of sets of PRB pairs may vary, although it may not be possible to explicitly

---

Set $C = \max(K^D, K^C)$.
Set H as the maximum value from $N_k^D$, where $k = 0, 1, \ldots, K^D - 1$, and $N_k^L$, where $k = 0, 1, \ldots, K^C - 1$.

$$\text{Set } S = \sum_{k=0}^{K^D-1} N_k^D + \sum_{k=0}^{K^C-1} N_k^C.$$

For each L,
    Set $R_k^{D,L} = 0$, where $k = 0, 1, \ldots, K^D - 1$, and $R_k^{C,L} = 0$, where $k = 0, 1, \ldots, K^C - 1$.
    Set $v, m = 0$
    while $v \leq H \cdot S$
        set $k = 0$
        while $k < C$
            if $k < K^D$ and $v < N_k^D \cdot M^L$ and $m < M^L$
                $R_k^{D,L} = R_k^{D,L} + 1$
                $m = m + 1$
            end
            if $k < K^C$ and $v < N_k^C \cdot M^L$ and $m < M^L$
                $R_k^{C,L} = R_k^{C,L} + 1$
                $m = m + 1$
            end
            $k = k + 1$
        end while
        $v = v + S$
    end while
end for.

---

Block 500 of FIG. 5 illustrates computing height unit S and max height H·S. Block 501 illustrates performing operations for the next level L. Block 502 illustrates setting watermark $v=0$, counter $m=0$, and all $R_k^L=0$. Block 503 illustrates clearing the set counter. Block 504 illustrates performing operations for the next set $N_k$. Block 505 illustrates determining whether $v<N_k$ and $m<M^L$. Block 506 illustrates incrementing blind decode $R_k^L=R_k^L+1$ and incrementing counter $m=m+1$. Block 507 illustrates determining whether all sets have been checked. Block 508 illustrates incrementing watermark $v=v+S$. Block 509 illustrates determining whether $v>H\cdot S$. Block 510 illustrates determining whether all levels L have been exhausted.

To provide another example, referring to FIG. 6A, Block 300's (FIG. 3) differentiating between the sets of PRB pairs may include assigning blind decoding candidates to the sets of PRB pairs in proportion to sizes of the respective sets of PRB pairs (Block 600A). In comparison, in previous LTE enumerate the partitioning of ePDCCH blind decoding candidates for all set numbers and sizes, and although explicit Radio Resource Control (RRC) signaling of assignments of blind decoding candidates from the network to the UE can be prohibitively expensive, various embodiments described herein (e.g., in FIGS. 4-6) allow a fixed number of blind decoding assignments to be partitioned between the ePDCCH sets of PRB pairs, whether localized or distributed, that are configured for a UE. For example, various embodiments provide for distributing the fixed number of blind decoding candidate assignments for an aggregation level across the configured sets of PRB pairs. As an example, the blind decoding candidates may be partitioned between the sets of PRB pairs in direct proportion to the number of PRBs configured for each set. Various embodiments may thus automatically determine the partitioning of blind decoding candidates for an aggregation level across multiple ePDCCH sets for which the UE may be configured. These operations may therefore save signaling overhead and memory at the network node/UE, by obviating the need to store lengthy tables.

B. Randomization

In the latest release of LTE being currently developed, it is possible for two or more sets of PRB pairs configured for a UE to partially or fully overlap. This may be useful when, for example, the UE is switching dynamically between two different transmission points while using the same ePDCCH resources. The current randomization function in Rel-8 of LTE varies the starting position for the list of search space candidates in a pseudo-random fashion with the variation depending on the Radio Network Temporary Identifier (RNTI) of the UE and depending on the subframe number. However, for the overlapping set case, it may be beneficial to vary this starting position pseudo-randomly based on the set number as well. Accordingly, the overlapping sets will have different starting points allowing two transmission points to send messages within the same search space.

The search space candidates (i.e., blind decoding candidates) are currently defined in LTE Rel-8 as follows. The $m^{th}$ search space candidate for aggregation level L is given by $$L \cdot \{(Y_k+m) \bmod \lfloor N_{CCE}/L \rfloor\}+i,$$

where $i \in \{0, \ldots, L-1\}$, $m \in \{0, \ldots, M^L-1\}$, with $M^L$ being the number of PDCCH candidates (i.e., blind decoding candidates) to monitor in the search space, and $Y_k$ being a randomizing function that is based on the RNTI and the subframe number. The function $Y_k$ is currently defined as:

$$Y_k=(A \cdot Y_{k-1}) \bmod D,$$

$$Y_{-1}=n_{RNTI} \neq 0, A=39827, D=65537 \text{ and } k=\lfloor n_s/2 \rfloor$$

where $n_s$ is the slot number within a radio frame. Thus, the RNTI and subframe number (two (2) slots within a subframe) dependencies are apparent.

For the ePDCCH, the same or a similar Rel-8 randomization procedure may be used, albeit separately within each set. For example, in various embodiments, for the ePDCCH, the randomization function, $Y_k$, is also modified so that it is dependent on the set number in addition to the slot number and the RNTI. As an example:

$$Y_k=(A \cdot Y_{k-1}) \bmod D,$$

$$Y_{-1}=n_{RNTI} \neq 0, A=39827, D=65537 \text{ and } k=\lfloor n_s/2 \rfloor+s_e$$

where $s_e$ is the ePDCCH set number and $S=(K^D+K^C)$ is the total number of sets in a subframe. This modification has the effect that the value of $Y_k$ changes with each successive set that is considered. When the UE finishes decoding the ePDCCH in a subframe, it computes what the value will be in the next subframe based on its configuration of ePDCCH sets.

Figure 7A:
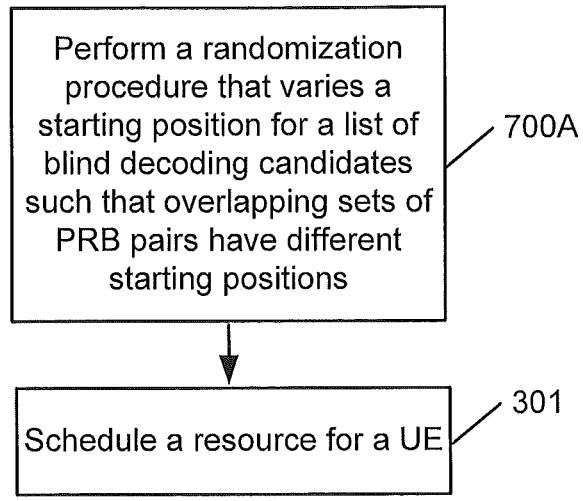
FIGS. 7A and 7B are flowcharts illustrating a randomization procedure that varies a starting position for a list of blind decoding candidates, according to various embodiments.
Figure 7B:
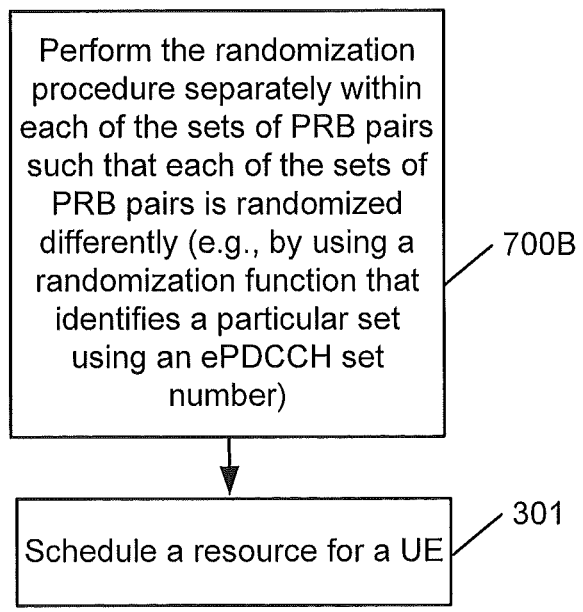

Referring now to FIGS. 7A and 7B, flowcharts are provided illustrating a randomization procedure that varies a starting position for a list of blind decoding candidates, according to various embodiments. For example, FIG. 7A illustrates that FIG. 3's indication in Block 300 of differentiating between the sets of PRB pairs may include performing a randomization procedure that varies a starting position for a list of blind decoding candidates such that overlapping ones of the sets of PRB pairs have different starting positions (Block 700A).

FIG. 7B illustrates that Block 700A's performance of the randomization procedure may include performing the randomization procedure separately within each of the sets of PRB pairs such that each of the sets of PRB pairs is randomized differently (Block 700B). As an example, performing the randomization procedure separately may include performing the randomization procedure for a particular set among a group of sets of PRB pairs, using a randomization function identifies the particular set. The randomization function may identify the particular set using an ePDCCH set number.

Accordingly, although the currently-used hash function in Rel-8 does not allow different blind decoding candidates for the sets of PRB pairs when two (2) sets configured for a UE are fully or partially overlapping, various embodiments described herein (e.g., in FIGS. 7A and 7B) randomize search space candidate selection (e.g., based on set numbers) to allow flexibility (e.g., in certain types of deployments where the UE may either receive data from multiple transmission points or dynamically switch between them). Moreover, it will be understood that for randomization based on set numbers, each set's randomization will be different. For example, each set will have a different randomization function $Y_k$. The randomization operations described herein may thus reduce blind decoding candidate conflicts between two (2) or more sets that may overlap in frequency.

C. Consecutive Blind Decoding Candidates

For localized transmission, it may be beneficial for an eNB to be able to choose between search space candidates in different locations in frequency. In various embodiments, however, the LTE Rel-8 search space candidate definitions may be modified so as to reduce/minimize the changes and make implementations less complex and less expensive. Specifically, an example of a modified version of the Rel-8 function is given below. The $m^{th}$ search space candidate for aggregation level L within a set allocated for localized transmission is given by $$L\{(Y_k+m') \bmod \lfloor N_{eCCE}/L \rfloor\}+i,$$

$$m'=(m \cdot W) \bmod N_{eCCE}+\lfloor m \cdot W/N_{eCCE} \rfloor,$$

where $$W = \max\left(\left\lfloor \frac{N_{eCCE}}{N \cdot L} \right\rfloor, 1\right)$$

and $i \in \{0, \ldots, L-1\}$, $m \in \{0, \ldots, M^L-1\}$, with $m^L$ being the number of ePDCCH candidates to monitor in the search space and $Y_k$ being modified as described herein (in the context of randomization) to add a dependence on the set number.

This function may ensure that two (2) consecutive blind decoding candidates considered by the UE occur in different PRB pairs. For example, when the number of extended Resource Element Groups (eREGs) per eCCE is four (4), there are N=2 PRB pairs per set, and the aggregation level is L=2, the four (4) possible search space candidates are searched (assuming $Y_k$=0 without any loss of generality) with the indices of the first eCCE in the order $\{0, 4, 2, 6\}$. The candidates with starting eCCE indices $\{0, 2\}$ are in the first PRB and the candidates with starting eCCE indices $\{4, 6\}$ are in the second PRB. It should be noted that a candidate with a starting eCCE index q consists of the eCCEs with indices q+i, $i \in \{0, \ldots, L-1\}$.

Figure 8A:
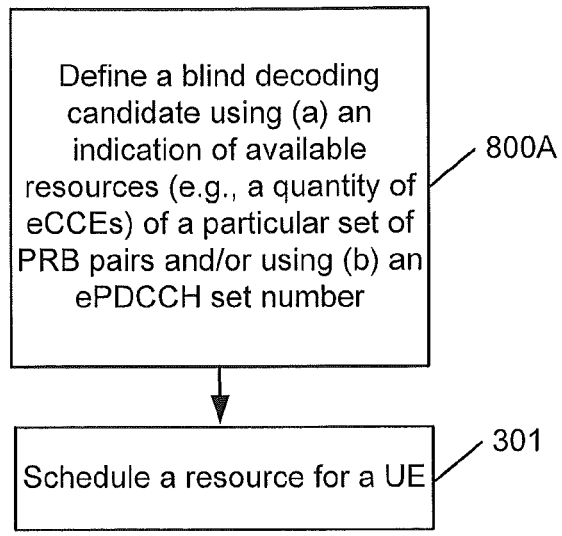
FIGS. 8A and 8B are flowcharts illustrating defining a blind decoding candidate using an indication of available resources, according to various embodiments.
Figure 8B:
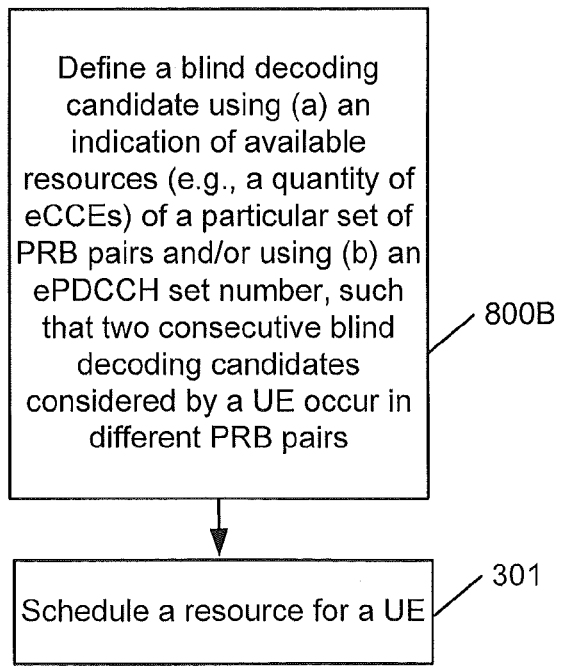

Referring now to FIGS. 8A and 8B, flowcharts are provided illustrating defining a blind decoding candidate using an indication of available resources, according to various embodiments. For example, FIG. 8A illustrates that Block 300's (FIG. 3) differentiation between the sets of PRB pairs may include defining a blind decoding candidate using an identification of a particular one of the sets of PRB pairs (Block 800A). The identification may include an indication of available resources (e.g., total available resources) of the particular set of PRB pairs, which may include an indication of a quantity of eCCEs of the particular set. In various embodiments, the identification may identify the particular set by using an ePDCCH set number.

FIG. 8B illustrates that Block 800A's operation of defining the blind decoding candidate may include defining the blind decoding candidate such that two (2) consecutive blind decoding candidates considered by the UE occur in different PRB pairs (Block 800B). Accordingly, as various embodiments may ensure that consecutively tested blind decoding candidates occur in different PRB pairs, it may further be ensured that frequency selective scheduling gains can be accrued.

D. Ordering/Indexing of Sets of Blind Decoding Candidates

For some combinations of set sizes and number of sets, some sets may have fewer blind decoding candidates than other sets. For example, when five (5) blind decoding candidates are split between three (3) sets, each with the same number of PRB pairs, two (2) of the sets are assigned two (2) blind decoding candidates, whereas one (1) set is assigned only one (1) blind decoding candidate. If the same sets are configured for all of the UEs, then the utilization and blocking performance in the set with fewer blind decoding candidates/possibilities may be different from the other sets, which may not be desirable.

To solve this problem, various embodiments may vary the order of the sets across UEs that are using the same ePDCCH resources. For example, referring now to FIG. 9, the set numbers may be varied for different UEs, whereas the designation of a set being localized or distributed may be common across all UEs. Therefore, the group of set numbers used for the distributed ePDCCH sets and the group of set numbers used for the localized ePDCCH sets may be the same across all UEs, whereas the numberings within each group may be permuted for each UE. As an example, permutations of the set numbering may be determined by the UE using a pseudorandom function of the RNTI.

In another example, the set numbers are not varied, but the order in which the sets are indexed when performing blind decoding candidate assignments and searches is modified. The pseudorandom parameter $Y_k$ and the set indexing described in preceding operations herein is determined in this example by $$k'=(k+Y_k) \bmod K^x,$$

where k' replaces k from preceding operations described herein, and x is D or L, dependent on the set k belongs to. Moreover, the pseudorandom parameter $Y_k$ and the set indexing may be determined by $$k'=(k+Y_k) \bmod K.$$

In other words, the permutations of the set indices may be done over all sets instead of being done independently over the distributed and localized group of sets. In this case, overlap of distributed and localized sets assigned to UEs may also vary pseudo-randomly.

In yet another example, the set numbering may be provided via Radio Resource Control (RRC) signaling by the network to the UE, and the UE does not need to perform any permutations.

Figure 9:
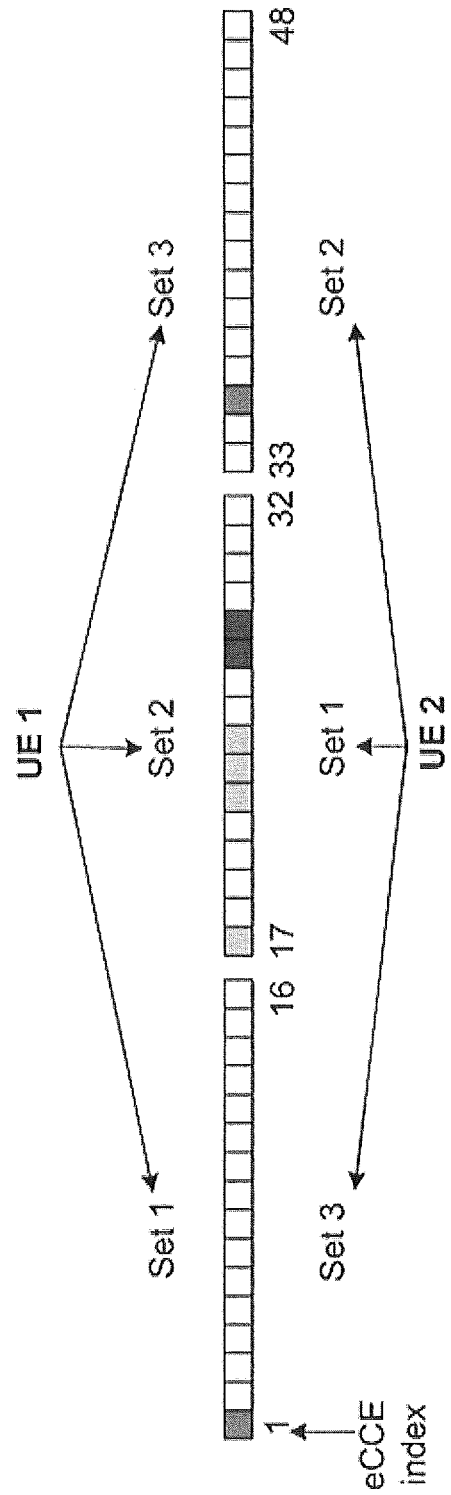
FIG. 9 illustrates a diagram of using different set numberings for different UEs, according to various embodiments.

Referring now to FIG. 9, a diagram of using different set numberings for different UEs is illustrated, according to various embodiments. In particular, FIG. 9 illustrates that Sets 1, 2, and 3 of PRB pairs for a first UE (UE 1) are ordered/numbered as Sets 3, 1, and 2, respectively, for a second UE (UE 2). These operations may allow the average utilization and blocking performance in each of the ePDCCH sets to be substantially equalized (e.g., the same).

Figure 10A:
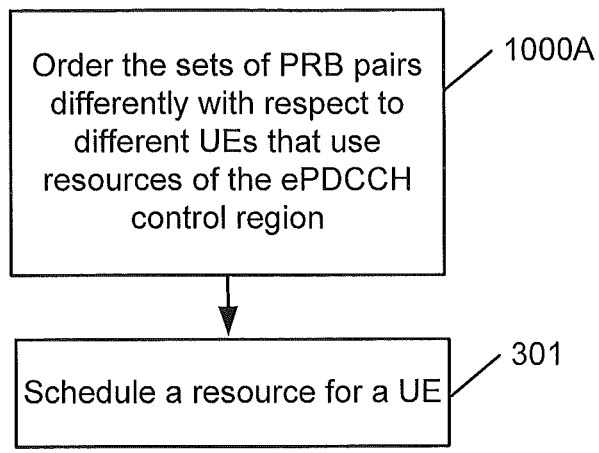
FIGS. 10A-10C are flowcharts illustrating using different orderings/numberings/indexes of sets of PRB pairs with different UEs, according to various embodiments.
Figure 10B:
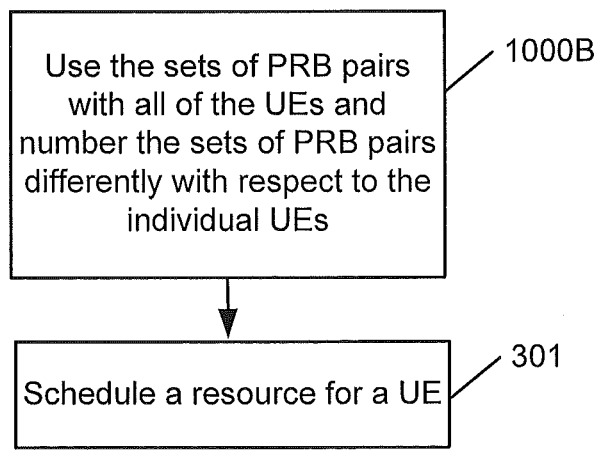
Figure 10C:
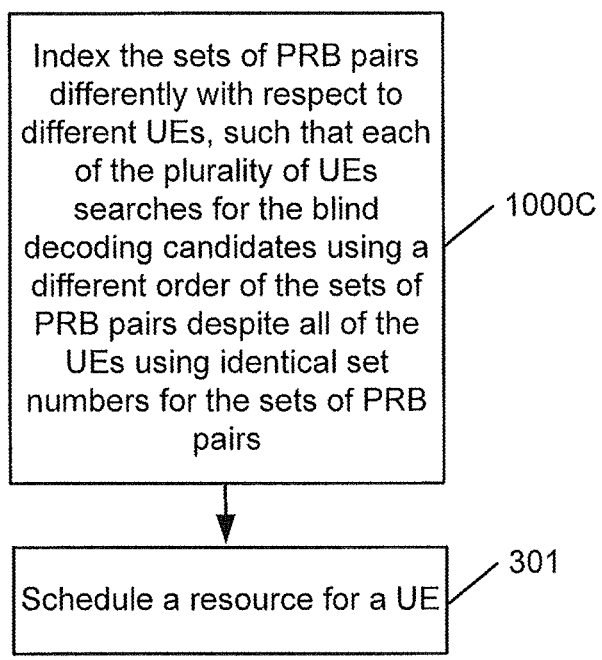

Referring now to FIGS. 10A-10C, flowcharts are provided illustrating using different orderings/numberings/indexes of sets of PRB pairs with different UEs, according to various embodiments. For example, FIG. 10A illustrates that Block 300's (FIG. 3) operation of differentiating between the sets of PRB pairs may include ordering the sets of PRB pairs differently with respect to different ones of a plurality of UEs that use resources of the ePDCCH control region (Block 1000A).

Referring to FIG. 10B, Block 1000A's operation of ordering the sets of PRB pairs differently may include using the sets of PRB pairs with all of the plurality of user equipments and numbering the sets of PRB pairs differently with respect to the different ones of the plurality of user equipments (1000B). A diagram of this operation is provided in FIG. 9, according to various embodiments.

Referring to FIG. 10C, Block 300's (FIG. 3) operation of differentiating between the sets of PRB pairs may include indexing the sets of PRB pairs differently with respect to different ones of a plurality of UEs that use resources of the ePDCCH control region, such that each of the UEs searches for the blind decoding candidates using a different order of the sets of PRB pairs despite all of the UEs using identical set numbers for the sets of PRB pairs (Block 1000C). For example, although the set numbers may not be varied with respect to the different UEs, the order in which the sets are indexed when performing blind decoding candidate assignment/searching may be modified. Accordingly, although the set numbering may be the same for multiple UEs, when the UEs search for a first blind decoding candidate, the different UEs will use different respective searching algorithms. As an example, although the UE 1 and UE 2 in FIG. 9 may number the Sets 1-3 identically (rather than using the different set numberings illustrated in FIG. 9), the UE 1 may start searching for blind decoding candidates with Set 1, whereas the UE 2 may start searching with Set 2 (i.e., a different set).

Accordingly, various embodiments described herein (e.g., as illustrated in FIGS. 9 and 10A-10C) may allow different UEs to identify the same set of PRB pairs differently. For example, different UEs may use a different set number or may use different indexing with respect to the set. Moreover, it will be understood that one of the UEs may optionally not use one of the sets, in various embodiments. For example, the UE 2 in FIG. 9 may optionally not use one of the Sets 1-3.

Figure 11:
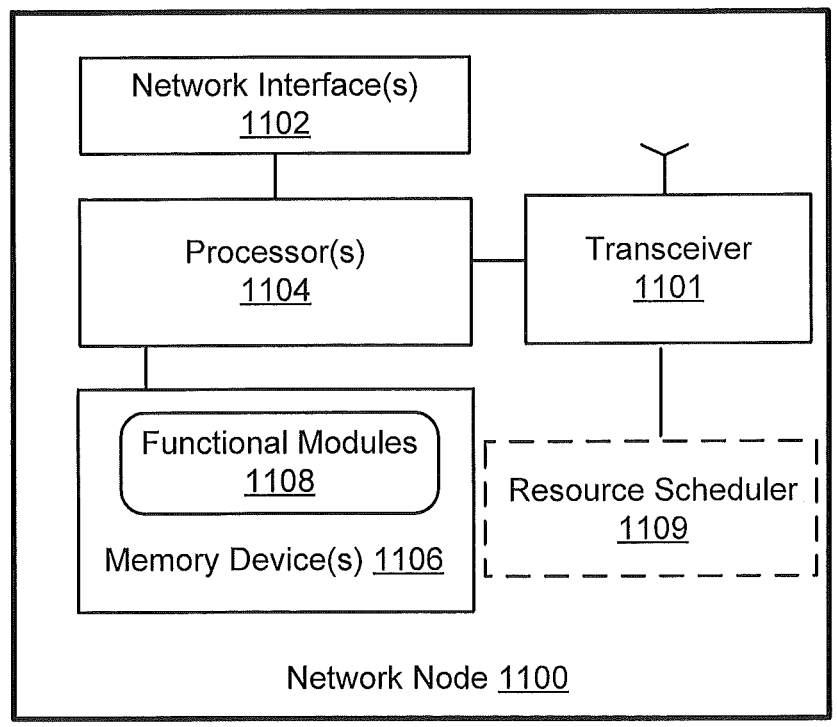
FIGS. 11 and 12 are block diagrams of a network node and a UE, respectively, according to various embodiments.
Figure 12:
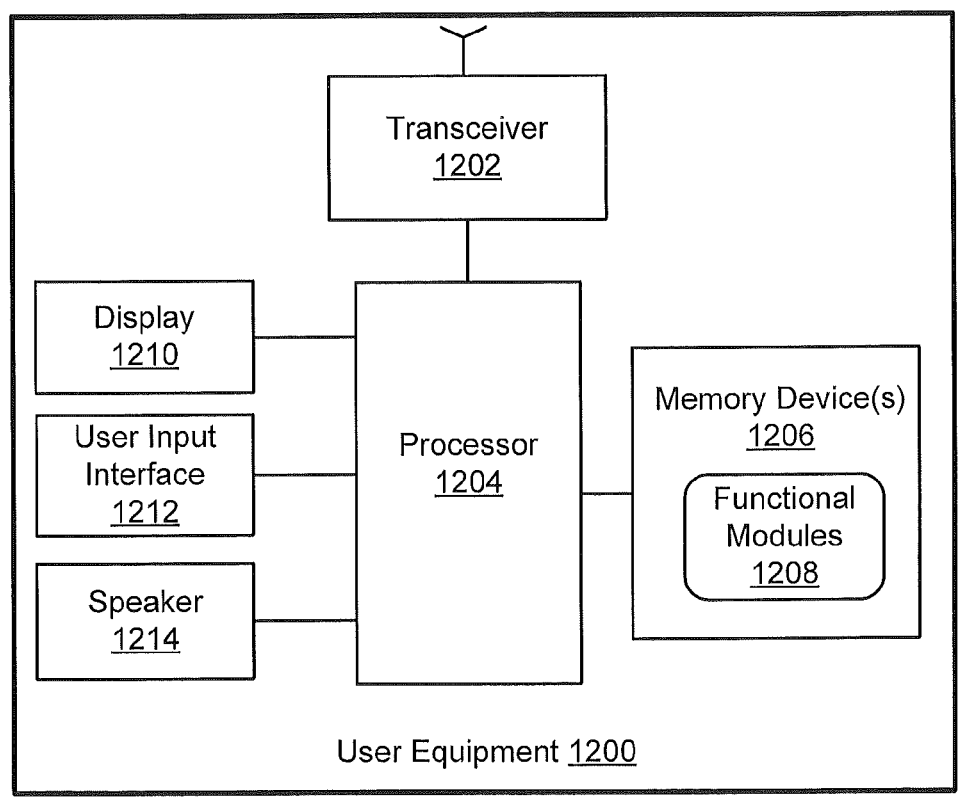

Referring now to FIGS. 11 and 12, block diagrams are provided of a network node and a UE, respectively, according to various embodiments. For example, FIG. 11 is a block diagram of a network node 1100 configured, according to various embodiments. Elements of the network node 1100 may be included in base stations (eNBs), Mobility Management Entities/Serving Gateways (MMEs/S-GWs), and/or another network node of a radio telecommunications system. The network node 1100 may optionally include a resource scheduler 1109. Moreover, the network node 1100 includes a transceiver 1101, network interface(s) 1102, a processor (e.g., controller) circuit 1104, and memory device(s) 1106 containing functional modules 1108.

The transceiver 1101 (e.g., a 3GPP compliant or other Radio Frequency (RF) communication transceiver) is configured to communicate with one or more UEs or another node of a radio telecommunications system. The processor 1104 may include one or more data processing circuits, such as a general purpose and/or special purpose processor (e.g., microprocessor and/or digital signal processor). The processor 1104 is configured to execute computer program instructions from the functional modules 1108 of the memory device(s) 1106 (e.g., a non-transitory computer readable medium), to perform at least some of the operations described herein as being performed by the network node. For example, the processor 1104 may be configured to transmit an ePDCCH message to the UE 1200, using the transceiver 1101. The network interface 1102 may communicate with the MME/S-GW (when located in a base station) or communicate with a base station (when located in the MME/S-GW).

Specifically, the transceiver 1101 of the network node 1100 may be configured to communicate using an ePDCCH. Moreover, the processor 1104 may be configured to differentiate between sets of PRB pairs in an ePDCCH control region when defining blind decoding candidates. The processor may also be configured to schedule a resource for a UE in response to differentiating between the sets of PRB pairs.

In one example, the processor 1104 may be configured to differentiate between the sets of PRB pairs by assigning blind decoding candidates to the sets of PRB pairs in proportion to sizes of the respective sets of PRB pairs. In another example, the processor 1104 may be configured to differentiate between the sets of PRB pairs by performing a randomization procedure that varies a starting position for a list of blind decoding candidates such that overlapping ones of the sets of PRB pairs have different starting positions. In yet another example, the processor 1104 may be configured to differentiate between the sets of PRB pairs by defining a blind decoding candidate using an identification of a particular one of the sets of PRB pairs such that two consecutive blind decoding candidates considered by the UE occur in different PRB pairs. In a further example, the processor 1104 may be configured to differentiate between the sets of PRB pairs by ordering the sets of PRB pairs differently with respect to different ones of a plurality of UEs that use resources of the ePDCCH control region.

FIG. 12 is a block diagram of a UE 1200 (e.g., any of the UEs described herein), according to various embodiments. The UE 1200 includes a transceiver 1202, a processor circuit 1204, and memory device(s) 1206 containing functional modules 1208. The UE 1200 may further include other elements, such as a display 1210, a user input interface 1212, and a speaker 1214.

The transceiver 1202 (e.g., a 3GPP compliant or other RF communication transceiver) is configured to communicate with a base station (eNB) over a wireless communication interface. The processor 1204 may include one or more data processing circuits, such as a general purpose and/or special purpose processor (e.g., microprocessor and/or digital signal processor). The processor 1204 is configured to execute computer program instructions from the functional modules 1208 of the memory device(s) 1206 (e.g., a non-transitory computer readable medium), to perform at least some of the operations described herein as being performed by a UE.

The UE 1200 may be a mobile telephone (e.g., a "cellular" telephone), a data terminal, and/or another processing device with wireless communication capability, such as, for example, a portable computer, a pocket computer, a handheld computer, a laptop computer, an electronic book reader, and/or a video game console.

Specifically, the transceiver 1202 of the UE 1200 may be configured to receive an ePDCCH message from the network node 1100 using an ePDCCH. Moreover, the processor 1204 of the UE 1200 may be configured to search blind decoding candidates that are defined with respect to differentiation between sets of PRB pairs in an ePDCCH control region, in response to receiving the ePDCCH message from the network node 1100.

In one example, the blind decoding candidates that the processor 1204 of the UE 1200 may be configured to search include blind decoding candidates that have been assigned (e.g., by the network node 1100) to the sets of PRB pairs in proportion to sizes of the respective sets of PRB pairs. In another example, the processor 1204 of the UE 1200 may be configured to search the blind decoding candidates by using a list of the blind decoding candidates with a starting position that varies such that overlapping ones of the sets of PRB pairs have different starting positions. In yet another example, at least one of the blind decoding candidates searched by the processor 1204 of the UE 1200 includes a blind decoding candidate defined using an identification of a particular one of the sets of PRB pairs such that two consecutive blind decoding candidates considered by the UE occur in different PRB pairs. In a further example, the processor 1204 may be configured to search the blind decoding candidates using an ordering of the sets of PRB pairs that is different from an ordering used by other UEs that use resources of the ePDCCH control region.

Figure 14A:
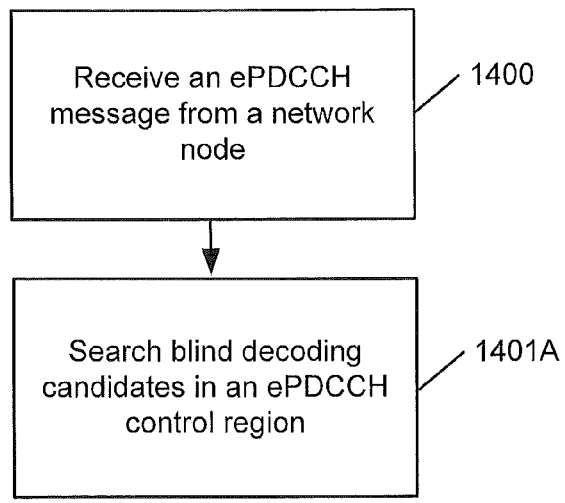
FIGS. 14A-14E are flowcharts illustrating operations of a UE.

Referring now to FIGS. 14A-14E, flowcharts are provided illustrating operations of a UE 1200. FIG. 14A illustrates that a UE 1200 may receive an ePDCCH message from a network node 1100, using an ePDCCH (Block 1400). The UE 1200 may then search blind decoding candidates defined with respect to differentiation between sets of PRB pairs in an ePDCCH control region, in response to receiving the ePDCCH message from the network node 1100 (Block 1401A).

Figure 14B:
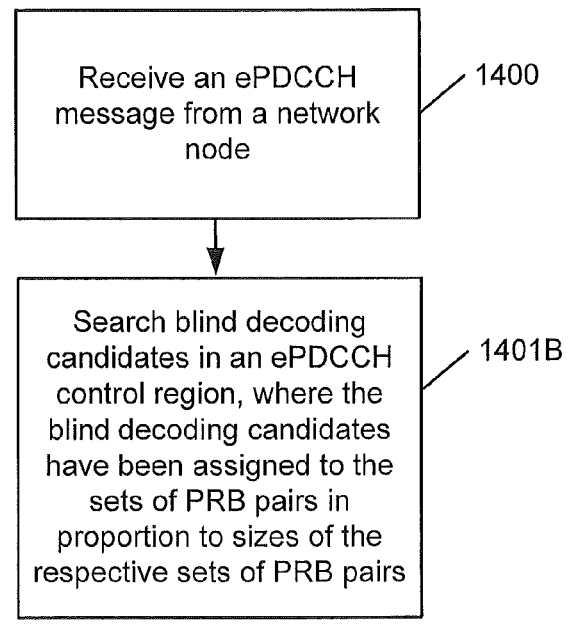
Figure 14C:
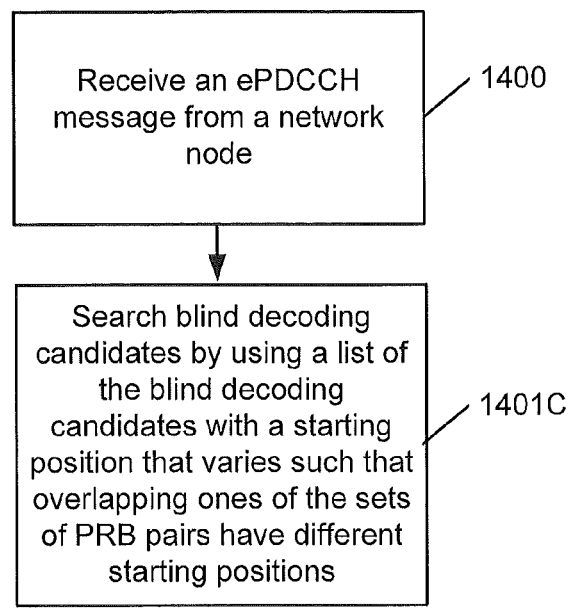
Figure 14D:
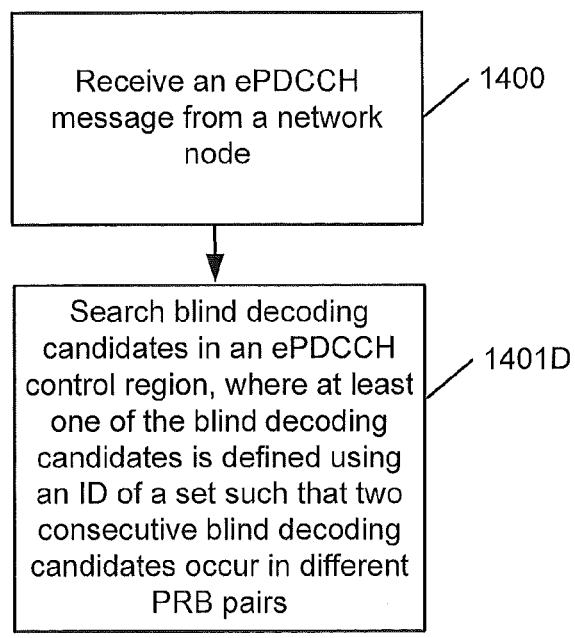
Figure 14E:
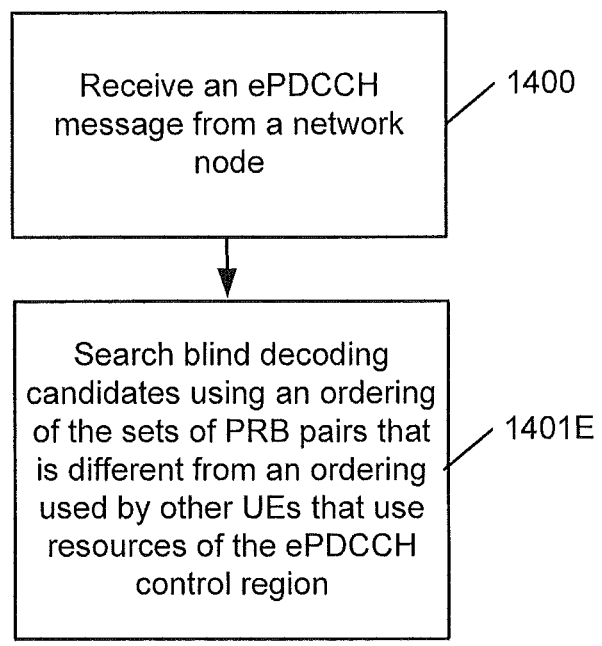

Referring to FIG. 14B, the blind decoding candidates searched in Block 1401A of FIG. 14A may be blind decoding candidates assigned to the sets of PRB pairs in proportion to sizes of the respective sets of PRB pairs (Block 1401B). Referring to FIG. 14C, Block 1401A's indication (in FIG. 14A) of searching the blind decoding candidates may include searching the blind decoding candidates by using a list of the blind decoding candidates with a starting position that varies such that overlapping ones of the sets of PRB pairs have different starting positions (Block 1401C). Referring to FIG. 14D, the blind decoding candidates searched in Block 1401A of FIG. 14A may include a blind decoding candidate that has been defined (e.g., by the network node 1100) using an identification of a particular one of the sets of PRB pairs such that two consecutive blind decoding candidates considered by the UE 1200 may occur in different PRB pairs (Block 1401D). Referring to FIG. 14E, Block 1401A's indication (in FIG. 14A) of searching the blind decoding candidates may include searching the blind decoding candidates using an ordering of the sets of PRB pairs that is different from an ordering used by other UEs that use resources of the ePDCCH control region (1401E).

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present disclosure. All such variations and modifications are intended to be included herein within the scope of the present disclosure. Accordingly, the above disclosed subject matter is to be considered illustrative, and not restrictive, and the appended claims are intended to cover all such modifications, enhancements, and other embodiments, which fall within the spirit and scope of the present disclosure.

What is claimed is:

1. A method of processing enhanced physical downlink control channel (ePDCCH) information by a network node of a radio telecommunications system, the method comprising:
   differentiating between sets of physical resource block (PRB) pairs in an ePDCCH control region when defining blind decoding candidates; and
   scheduling a resource for a user equipment in response to differentiating between the sets of PRB pairs,
   wherein differentiating between the sets of PRB pairs comprises:
   performing a randomization procedure that varies a starting position for a list of blind decoding candidates such that overlapping ones of the sets of PRB pairs have different starting positions, and
   wherein performing the randomization procedure comprises:
   performing the randomization procedure separately within each of the sets of PRB pairs such that each of the sets of PRB pairs is randomized differently.

2. The method of claim 1, wherein differentiating between the sets of PRB pairs comprises:
   assigning blind decoding candidates to the sets of PRB pairs in proportion to different sizes of the respective sets of PRB pairs.

3. The method of claim 2, wherein assigning the blind decoding candidates comprises:
   assigning at least one blind decoding candidate to each of the sets of PRB pairs.

4. The method of claim 2, wherein assigning the blind decoding candidates in proportion to the different sizes of the respective sets of PRB pairs comprises:
   forming an array representing the sets of PRB pairs; and
   populating the array to represent the blind decoding candidates assigned to the respective sets of PRB pairs.

5. The method of claim 4, wherein the different sizes of the respective sets of PRB pairs comprise different quantities of PRBs in the respective sets of PRB pairs.

6. The method of Claim 1, wherein performing the randomization procedure separately within each of the sets of PRB pairs comprises:
   performing the randomization procedure for a particular one of the sets of PRB pairs using a randomization function that identifies the particular one of the sets of PRB pairs.

7. The method of claim 6, wherein the randomization function identifies the particular one of the sets of PRB pairs using an ePDCCH set number.

8. The method of claim 1, wherein differentiating between the sets of PRB pairs comprises:
   defining a blind decoding candidate using an identification of a particular one of the sets of PRB pairs.

9. The method of claim 8, wherein the identification comprises an indication of available resources of the particular one of the sets of PRB pairs.

10. The method of claim 9, wherein the indication of the available resources comprises a quantity of enhanced control channel elements (eCCEs) of the particular one of the sets of PRB pairs.

11. The method of claim 8, wherein the identification identifies the particular one of the sets of PRB pairs using an ePDCCH set number.

12. The method of claim 8, wherein defining the blind decoding candidate comprises:
    defining the blind decoding candidate such that two consecutive blind decoding candidates considered by the user equipment occur in different PRB pairs.

13. The method of claim 1, wherein differentiating between the sets of PRB pairs comprises:
    ordering the sets of PRB pairs differently with respect to different ones of a plurality of user equipments that use resources of the ePDCCH control region.

14. The method of claim 13, wherein ordering the sets of PRB pairs differently comprises:
    using the sets of PRB pairs with all of the plurality of user equipments and numbering the sets of PRB pairs differently with respect to the different ones of the plurality of user equipments.

15. The method of claim 1, wherein differentiating between the sets of PRB pairs comprises:
    indexing the sets of PRB pairs differently with respect to different ones of a plurality of user equipments that use resources of the ePDCCH control region, such that each of the plurality of user equipments searches for the blind decoding candidates using a different order of the sets of PRB pairs despite all of the plurality of user equipments using identical set numbers for the sets of PRB pairs.

16. A network node of a radio telecommunications system, the network node comprising:
    a transceiver configured to communicate using an enhanced physical downlink control channel, ePDCCH; and
    a processor configured to:
    differentiate between sets of physical resource block, PRB, pairs in an ePDCCH control region when defining blind decoding candidates; and
    schedule a resource for a user equipment in response to differentiating between the sets of PRB pairs,
    wherein the processor is configured to differentiate between the sets of PRB pairs by performing a randomization procedure that varies a starting position for a list of blind decoding candidates such that overlapping ones of the sets of PRB pairs have different starting positions, and
    wherein performing the randomization procedure comprises:
    performing the randomization procedure separately within each of the sets of PRB pairs such that each of the sets of PRB pairs is randomized differently.

17. The node of claim 16, wherein the processor is configured to differentiate between the sets of PRB pairs by assigning blind decoding candidates to the sets of PRB pairs in proportion to different sizes of the respective sets of PRB pairs.

18. The node of claim 16, wherein the processor is configured to differentiate between the sets of PRB pairs by defining a blind decoding candidate using an identification of a particular one of the sets of PRB pairs such that two consecutive blind decoding candidates considered by the user equipment occur in different PRB pairs.

19. The node of claim 16, wherein the processor is configured to differentiate between the sets of PRB pairs by ordering the sets of PRB pairs differently with respect to different ones of a plurality of user equipments that use resources of the ePDCCH control region.

20. A User Equipment (UE) of a radio telecommunications system, the UE comprising:
    a transceiver configured to:
    receive an enhanced physical downlink control channel (ePDCCH) message from a network node, using an ePDCCH; and
    a processor configured to:
    search blind decoding candidates defined with respect to differentiation between sets of physical resource block, PRB, pairs in an ePDCCH control region, in response to receiving the ePDCCH message from the network node, wherein the processor is configured to search the blind decoding candidates by using a list of the blind decoding candidates with a starting position that varies such that overlapping ones of the sets of PRB pairs have different starting positions, and wherein each of the sets of PRB pairs is randomized differently.

21. The UE of claim 20, wherein the blind decoding candidates comprise blind decoding candidates assigned to the sets of PRB pairs in proportion to different sizes of the respective sets of PRB pairs.

22. The UE of claim 20, wherein at least one of the blind decoding candidates comprises a blind decoding candidate defined using an identification of a particular one of the sets of PRB pairs such that two consecutive blind decoding candidates considered by the UE occur in different PRB pairs.

23. The UE of claim 20, wherein the processor is configured to search the blind decoding candidates using an ordering of the sets of PRB pairs that is different from an ordering used by other UEs that use resources of the ePDCCH control region.

24. A method of operating a User Equipment (UE) of a radio telecommunications system, the method comprising:

receiving an enhanced physical downlink control channel (ePDCCH) message from a network node, using an ePDCCH; and searching blind decoding candidates defined with respect to differentiation between sets of physical resource block (PRB) pairs in an ePDCCH control region, in response to receiving the ePDCCH message from the network node, wherein searching the blind decoding candidates comprises searching the blind decoding candidates by using a list of the blind decoding candidates with a starting position that varies such that overlapping ones of the sets of PRB pairs have different starting positions, and wherein each of the sets of PRB pairs is randomized differently.

25. The method of claim 24, wherein the blind decoding candidates comprise blind decoding candidates assigned to the sets of PRB pairs in proportion to different sizes of the respective sets of PRB pairs.

26. The method of claim 24, wherein at least one of the blind decoding candidates comprises a blind decoding candidate defined using an identification of a particular one of the sets of PRB pairs such that two consecutive blind decoding candidates considered by the UE occur in different PRB pairs.

27. The method of claim 24, wherein searching the blind decoding candidates comprises searching the blind decoding candidates using an ordering of the sets of PRB pairs that is different from an ordering used by other UEs that use resources of the ePDCCH control region.

* * * * *